(12) United States Patent
Baldwin

(10) Patent No.: US 11,351,614 B2
(45) Date of Patent: Jun. 7, 2022

(54) PIPE REAMING APPARATUS

(71) Applicant: Baldwin Products, LLC, Tillamook, OR (US)

(72) Inventor: Tyler Baldwin, Tillamook, OR (US)

(73) Assignee: Baldwin Products, LLC, Tillamook, OR (US)

( * ) Notice: Subject to any disclaimer, the term of this patent is extended or adjusted under 35 U.S.C. 154(b) by 435 days.

(21) Appl. No.: 16/442,275

(22) Filed: Jun. 14, 2019

(65) Prior Publication Data

US 2020/0391296 A1 Dec. 17, 2020

(51) Int. Cl.
*B23B 5/16* (2006.01)

(52) U.S. Cl.
CPC .......... *B23B 5/168* (2013.01); *B23B 2215/72* (2013.01)

(58) Field of Classification Search
CPC ..... Y10T 408/9093; B44B 3/04; B44B 3/006; B23B 5/16; B23B 2215/72; B23B 5/168; B23D 53/12; B23D 59/00
See application file for complete search history.

(56) References Cited

U.S. PATENT DOCUMENTS

| | | | | |
|---|---|---|---|---|
| 2,583,246 A | * | 1/1952 | Williams | B23B 5/167 408/211 |
| 2,761,335 A | * | 9/1956 | Bernardi | B23B 5/168 408/224 |
| 4,175,895 A | * | 11/1979 | Burroughs | B23B 5/167 30/172 |
| 4,930,946 A | * | 6/1990 | Phillips, Sr. | B23B 5/167 408/211 |
| 5,054,972 A | * | 10/1991 | Cooney | B23B 5/167 408/211 |
| 5,427,477 A | * | 6/1995 | Weiss | B23B 5/168 408/1 R |
| 5,567,092 A | * | 10/1996 | Post | B23C 5/006 407/36 |
| 7,614,326 B2 | * | 11/2009 | Peltonen | B23B 29/03403 408/147 |
| D803,285 S | * | 11/2017 | O'Barr | D15/139 |
| 2006/0018728 A1 | * | 1/2006 | Hall | B23B 5/167 409/231 |
| 2013/0055507 A1 | * | 3/2013 | Li | B23B 5/167 7/157 |
| 2014/0260883 A1 | * | 9/2014 | Willburn | B26D 3/169 83/869 |

(Continued)

*Primary Examiner* — Sara Addisu
(74) *Attorney, Agent, or Firm* — Lee & Hayes, P.C.

(57) ABSTRACT

A reaming apparatus for reaming pipe may include a body having a planar front surface, an annular groove defined in the planar front surface of the body and concentric with a center of the body, and a straight groove defined in the planar front surface of the body, radially aligned with the center of the body, and intersecting the annular groove. The straight groove may pass through the center of the body. The reaming apparatus may include a reaming blade having a planar front surface and at least one notch defined in the planar front surface of the reaming blade, the at least one notch being positioned on the reaming blade to substantially align with the annular groove when the reaming blade is disposed within the straight groove. The reaming apparatus can be removably mounted to a pulley of a bandsaw to ream pipe under the power of the bandsaw.

20 Claims, 10 Drawing Sheets

(56) References Cited

U.S. PATENT DOCUMENTS

2015/0321260 A1\* 11/2015 Goodman ............... B23B 5/167
                                                                         82/1.11
2017/0197457 A1\* 7/2017 Garr ........................ B44B 3/006
2020/0338656 A1\* 10/2020 Su ........................... B23B 5/167

\* cited by examiner (SECTION A-A)

(SECTION B-B)

(SECTION C-C)

PIPE REAMING APPARATUS

BACKGROUND

Electrical metallic tubing (EMT), sometimes referred to as thin-wall conduit, is a general-purpose raceway, or electrical conduit, that is used to enclose electrical wiring. The conduit may protect the wiring from heat, humidity, corrosion, water intrusion, and/or general physical threats. The National Electrical Code (NEC), under Article 358, recognizes listed EMT as a conduit that is suitable for enclosing electrical wiring rated 600 Volts or less in most indoor installation conditions. EMT has a circular cross section, and is sold in nominal lengths of 10 feet and 20 feet, and with trade sizes that range from ½ inch to 4 inches in diameter. To install EMT at a job site, the installer (e.g., an electrician) may pull electrical wire through the EMT to provide users of a building with access to electricity throughout the building. Oftentimes, during this installation process, the installer needs to cut a section of EMT having a nominal length to a shorter length, and then couple the cut end of the EMT to another section of EMT in order to fit the EMT in the area where it is being installed. The installer uses a cutting tool (e.g., a bandsaw, a reciprocating saw, a hacksaw, etc.) to cut the EMT, which creates ragged edges or protrusions, called "burrs", at the location of the cut. If these burrs are left on the EMT, they can damage the electrical wiring as it is pulled through the conduit, such as by tearing the insulating sheath (scarring) around the wiring, hanging up the wiring as it is being pulled through the EMT, and/or severing the wires. For these reasons, the installer has to ream the EMT in order to deburr the EMT (i.e., remove the burrs from the EMT) at the location of the cut. This reaming operation is done before the cut end of the EMT is coupled to another section of EMT, thereby mitigating the damage to the electrical wiring during installation.

Pipe-threading machines, such as the RIGID® Model 300, are available for cutting, reaming, and threading thick-wall conduit, such as rigid metal conduit (RMC) or intermediate metal conduit (IMC). However, these pipe-threading machines are not suitable for cutting and reaming thin-wall conduit, such as EMT, because the EMT cannot withstand the force required to clamp the EMT in position on the machine—the EMT would collapse, or be crushed, under the clamping pressure. In most cases, the EMT would also flare at the cut end if the machine were to ream the inside of the EMT at the cut end. For these and other reasons, installers of EMT often use hand reamers, such as reaming pens, reaming screwdrivers, or the like, to ream EMT after cutting it with a suitable cutting tool, like a bandsaw, a reciprocating saw, or a hacksaw. To use a hand reamer, the installer may insert one end of the reamer into the cut end of the EMT, and the installer may hand-turn the reamer relative to the EMT in order to deburr the cut end of the EMT. For larger diameter pipe, a file is often used as a reaming tool to deburr the cut end of the pipe by hand-filing the inner and outer edges of the cut end of the pipe.

Using existing hand reamers on EMT is time consuming for installers because the installer has to pick up a cutting tool, then cut the EMT with the cutting tool, then set the cutting tool down, then pick up a hand reamer, and finally ream the EMT using the hand reamer, and this process often needs to be repeated (i.e., repeatedly setting one tool down to use the other tool). This contributes to longer, slower installation of EMT, which, for a construction project, ultimately reduces the profitability. This is especially impactful in situations where the installer might be on a ladder, cutting EMT on the ceiling of a building, and the installer has to climb down the ladder after cutting the EMT, or set a bandsaw precariously on the top of the ladder or hand it to an apprentice standing beside the ladder. Not only is this time consuming, but it can be dangerous for the installer and other personnel at the job site. Hand reamers can also cause hand fatigue if the installer is using the hand reamer frequently and/or for a long period of extended use. Hand reamers also require some amount of training and focus to use properly (e.g., the user typically must ensure that the reamer is held at the proper angle, and that the proper amount of pressure is applied, while using the reamer).

The disclosure made herein is presented with respect to these and other considerations.

SUMMARY

Disclosed herein is, among other things, a reaming apparatus that is configured to be mounted to a bandsaw and used to ream pipe. Specifically, the reaming apparatus is configured to rotate under the power of the bandsaw while mounted thereto. The reaming apparatus may include a body having a planar front surface, an annular groove defined in the planar front surface of the body and concentric with a center of the body, and a straight groove defined in the planar front surface of the body, the straight groove being radially aligned with the center of the body and intersecting the annular groove. The straight groove may pass through the center of the body, in some embodiments. The reaming apparatus may further include a reaming blade having a planar front surface and at least one notch defined in the planar front surface of the reaming blade, the at least one notch being positioned on the reaming blade to substantially align with the annular groove when the reaming blade is disposed within the straight groove. Accordingly, when the cut end of a pipe is received within, an annular groove of the reaming apparatus and engaged with the reaming blade, the notch(es) of the reaming blade that is/are aligned with that annular groove ream both the inner and outer edges of the cut end of the pipe as the reaming apparatus rotates under the power of the bandsaw.

In some embodiments, the reaming apparatus may include a through hole in the center of the body that can be used to mount the reaming apparatus to a pulley of a bandsaw. The reaming blade may be secured within the straight groove by one or more fasteners that are fastened into holes that extend from the side surface of the reaming apparatus to the straight groove in the body of the reaming apparatus. Accordingly, the fastener(s) can engage the reaming blade in the straight groove to secure the reaming blade within the straight groove by pinching or clamping the reaming blade against the body. In order to mount the reaming apparatus to a pulley of a bandsaw, a user may unscrew the fastener(s) and remove the reaming blade from the straight groove, thereby exposing the through hole in the center of the body. A user may place the reaming apparatus on the pulley of the bandsaw by aligning the through hole in the center of the body with a threaded hole in the center of the bandsaw's pulley. By inserting a fastener into the through hole in the center of the body and screwing the fastener into the threaded hole in the center of the bandsaw's pulley, the body of the reaming apparatus can be removably mounted to the bandsaw's pulley in such a manner that the reaming apparatus is concentric with the bandsaw's pulley. The reaming blade can be inserted into, and secured within, the straight groove in the body using the fastener(s), and the reaming apparatus is thereby ready for use to ream pipe. A user can thereby use the bandsaw with the reaming apparatus mounted thereto for both cutting and reaming pipe in a seamless process.

For example, the disclosed reaming apparatus, when mounted to a bandsaw, allows a user to cut and ream pipe more efficiently, as compared to using cutting tools with existing hand reamers. The user of the disclosed reaming apparatus, when the reaming apparatus is mounted to a bandsaw, does not have to use separate tools to cut and ream the pipe, which is a waste of time. Instead, with the disclosed reaming apparatus affixed to a bandsaw, the user can cut and ream the pipe with a single tool, without having to set down the bandsaw when transitioning from cutting to reaming. This is especially useful in situations where the user might be on a ladder, cutting pipe that is on the ceiling of a building. In this situation, the user does not have to climb down the ladder after cutting the pipe, or set the bandsaw precariously on the top of the ladder, or hand the bandsaw to an apprentice standing beside the ladder. Instead, the user can seamlessly cut and ream the pipe on the ceiling using the same tool, without having to set it down in between cutting and reaming operations. This allows for a shorter, faster installation of pipe, which ultimately increases the profitability of a construction project. The disclosed reaming apparatus also reduces hand fatigue that can result from frequently using a hand reamer.

In addition, the disclosed reaming apparatus is a universal tool that can be used to ream pipe over a range of different sizes. For instance, the reaming apparatus disclosed herein may have a plurality of annular grooves defined in the planar front surface of the body and concentric with a center of the body. In these embodiments, a first annular groove may have a first diameter and a first width, and a second annular groove may have a second diameter smaller than the first diameter and a second width smaller than the first width. This allows for reaming pipes having different diameters and different wall thicknesses.

The reaming blade, being removable from the body of the reaming apparatus, can be easily replaced, or swapped, for installing a new or different blade, and/or for sharpening the reaming blade. Furthermore, the design of the reaming apparatus is preferable to traditional hand reamers by virtue of having a reaming blade that, in some embodiments, has multiple notches that are in contact with a pipe, and that each revolve around a circumference of the pipe in a single revolution. For instance, traditional hand reamers typically have a single reaming blade, which means that one revolution with the hand reamer equates to a single ream. By contrast, the disclosed reaming apparatus can have a reaming blade with two notches (e.g., v-shaped notches) spaced apart by a distance that is about equal to the diameter of the pipe to be reamed. This means that one revolution with the disclosed reaming apparatus can equate to two reams. This makes reaming twice as fast (half the amount of time) as a reaming with a traditional hand reamer, and it can improve the quality of the ream because it is more likely to sufficiently deburr the cut end of the pipe, whereas the hand fatigue associated with using traditional hand reamers can result in some burrs remaining on the cut end of the pipe.

The disclosed reaming apparatus is also designed with safety in mind. For instance, the reaming blade, when secured within the straight groove of the body, does not extend beyond the planar front surface of the body of the reaming apparatus. This design is for optimized safety when using the reaming apparatus on a bandsaw. At the high revolutions per minute (RPM) of a rotating bandsaw, an apparatus with cutting blades that are exposed and able to cut the user could be dangerous. The disclosed reaming apparatus has a reaming blade that is recessed below the planar front surface of the body so that the reaming blade itself cannot cut or otherwise harm the user during operation.

While the examples described herein pertain primarily to a reaming apparatus that is suitable for reaming EMT, it is to be appreciated that the disclosed reaming apparatus can be used to ream other types of piping, including thick-wall conduit (e.g., IMC, RMC, etc.), polyvinyl chloride (PVC) pipe, copper pipe used for water transport. As such, the reaming apparatus may be used by any suitable type of user, including, without limitation, electricians, plumbers, or any other type of tradesperson who cuts and reams pipe in the field, and it may be used to ream pipe over a range of pipe materials and a range of pipe diameters.

Other features and advantages of the present disclosure will become apparent from the following description, which refers to the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
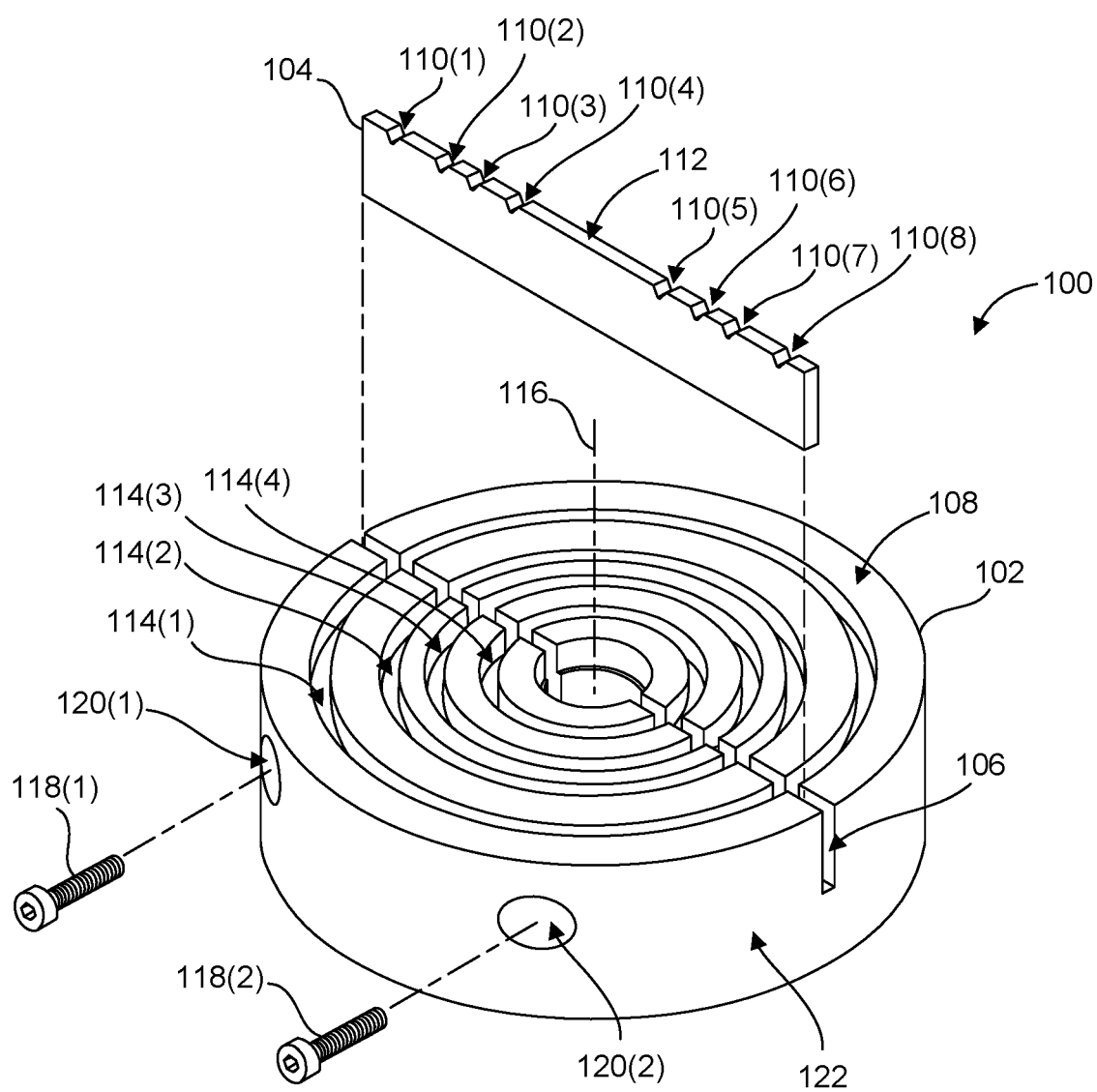
FIG. 1 illustrates a perspective view of an example reaming apparatus according to embodiments disclosed herein.

Referring to FIG. 1, there is illustrated a reaming apparatus 100 according to an example embodiment. The reaming apparatus 100 is sometimes referred to herein as a "reaming device 100", a "reaming head 100", a "reaming adapter 100," a "reamer 100", a "pipe reamer 100," or a "pipe reaming apparatus 100", and this terminology may be used interchangeably herein with the terminology "reaming apparatus 100." FIG. 1 illustrates a perspective view of the reaming apparatus 100, while other views of the reaming apparatus 100 are shown in FIGS. 4-9, including cross-sectional views. In general, the reaming apparatus 100 is configured to be mounted to a bandsaw and used to ream a pipe by rotating under the power of the bandsaw while mounted thereto. Use of the reaming apparatus 100 in this manner will be described in more detail with reference to FIGS. 2A, 2B, 3A, and 3B.

As shown in FIG. 1, the reaming apparatus 100 may include, without limitation, a body 102 (sometimes referred to as a "body portion 102") and a reaming blade 104 (sometimes referred to herein as a "cutter 104" or a "blade 104"). The body 102 is shown in FIG. 1 as being cylindrical in shape, meaning that the cross-sectional shape of the body 102 is generally circular. It is to be appreciated, however, that the body 102 is not limited herein to a cylindrically-shaped body 102, as the body 102 may have any suitable shape corresponding to any suitable polygonal cross-section, such as a triangular cross section, a square cross-section, a pentagonal cross-section, an octagonal cross section, and so on. Furthermore, the body 102 may be of any suitable size. For example, the diameter of the body 102 shown in FIG. 1 may be about 3.5 inches, which allows the reaming apparatus 100 to be mounted to a conventional bandsaw (e.g., a portable bandsaw) for reaming pipe over a range of diameters, including standard sizes of EMT that are commonly used as conduit for electrical wiring. For example, the body 102 may be sized to be mounted to a bandsaw and to ream EMT having a trade size including, without limitation, ½ inch EMT, ¾ inch EMT, 1-inch EMT, 1¼ inch EMT, 1½ inch EMT, 2-inch EMT, 2½ inch EMT, and/or 3-inch EMT. At this size, a user can hold the reaming apparatus 100 in a single hand. It is to be appreciated that the size of the body 102 can be scaled to larger sizes for reaming larger-diameter pipe. In this scenario, the reaming apparatus 100 may be mounted to another type of machine, as opposed to a bandsaw, in order to rotate the reaming apparatus 100 while reaming pipe. For example, a benchtop machine at a jobsite or a workshop may be configured to have a reaming apparatus 100 that is larger than 3.5 inches in diameter mounted thereto, and may be configured to rotate the reaming apparatus 100 to ream relatively large diameter pipe, including RMC, IMC, or the like.

The body 102 may be made of any suitable material, combination of materials, or composite materials. For example, the body 102 can be made of metal, such as aluminum, stainless steel, titanium, copper, or any other suitable metallic material. In some embodiments, the body 102 may be made of any suitable base material and coated with a metallic coating for increased durability. In some embodiments, the body 102 can be made of a carbon fiber material or a thermoplastic material (e.g., acrylonitrile butadiene styrene (ABS) plastic) to produce a body 102 that that is relatively rigid and also lightweight, which helps to minimize the overall weight of a bandsaw with the reaming apparatus 100 affixed thereto. Other suitable materials for the body 102 include, without limitation, acrylic, wood, or any other material that is suitable for use in construction tools. In some embodiments, the body 102 can be made of a molded plastic or polymer. In general, the body 102 can be made of any suitably-rigid material that can hold the reaming blade 104, can be affixed to a bandsaw, and can withstand the pressure and torque that is applied to the body 102 while a pipe of any suitable material (e.g., EMT) is reamed with the reaming apparatus 100.

In some embodiments, the body 102 may be manufactured using a subtractive manufacturing process, such as a process where a block of material (e.g., metal) is machined in order to create the shape of the body 102 and the various grooves, holes, features, and contours of the body 102 that are shown in the figures. Other suitable manufacturing techniques include, without limitation, injection molding, extrusion, three-dimensional (3D) printing (i.e., an additive manufacturing process), and the like. These general types of manufacturing techniques are known to a person having ordinary skill in the art.

The reaming blade 104 is shown in FIG. 1 as being an elongate member that is substantially straight. The straight shape of the reaming blade 104 enables the reaming blade 104 to fit within a correspondingly-straight groove 106 that is defined in a planar front surface 108 of the body 102. The reaming blade 104 may be made of any suitable material, combination of materials, or composite materials. For example, the reaming blade 104 can be made of metal, such as stainless steel, iron, or titanium. In general, the reaming blade 104 can be made of any material that is harder than the material of the pipe that is to be reamed. As such, the material of the reaming blade 104 may depend on the material of the pipe for which the reaming apparatus 100 is to be used to ream. To ream EMT, a stainless-steel reaming blade 104 is suitable, although other suitable materials can be used to make the reaming blade.

Although the side surfaces and the back surface of the reaming blade 104 can be planar and substantially devoid of features, one or more notches 110 may be defined in a planar front surface 112 of the reaming blade 104. The example of FIG. 1 shows a reaming blade 104 having eight notches 110(1), 110(2), 110(3), 110(4), 110(5), 110(6), 110(7), and 110(8) (collectively 110) that are distributed along a length of the reaming blade 104 and defined in the planar front surface 112 of the reaming blade 104, although any suitable number of notches 110 may be defined in the planar front surface 112 of the reaming blade 104, such as a single notch 110, or a plurality of notches 110.

In the example of FIG. 1, the first, innermost pair of notches 110(4) and 110(5) are configured to ream a pipe having a first, smallest diameter that is equal to the distance between the pair of notches 110(4) and 110(5). An individual notch 110 can be v-shaped, whereby the width of the notch gets progressively smaller and comes to a point a distance below the planar front surface 112 of the reaming blade 104. The v-shape of the notch 110 allows for reaming (or deburring) both the inner edge and the outer edge of the cut end of a pipe as the reaming apparatus 100 rotates (e.g., under the power of a bandsaw) while a pipe is engaged with at least one notch 110 of the reaming blade 104. The pairs of notches 110 on the reaming blade 104 (e.g., the pair of notches 110(4) and 110(5)), as shown in FIG. 1, are equidistant from a center of the reaming blade 104, and they allow for two reams of a pipe in a single revolution of the reaming apparatus 100. For example, the notch 110(4) and the notch 110(5) each make a full revolution around a circumference of a pipe that is being reamed during a single revolution of the reaming apparatus 100 relative to the pipe, which equates to two reams in a single revolution. This makes reaming twice as fast (half the amount of time), as compared to reaming with a traditional hand reamer, which typically has a single reaming blade, which reams either the inner edge or the outer edge of the cut end of the pipe once per revolution. The pairs of notches 110 can also improve the quality of the ream because it is more likely that the cut end of the pipe will be adequately deburred, whereas the hand fatigue associated with using traditional hand reamers can result in some burrs remaining on the cut end of the pipe after attempting to ream the pipe with the hand reamer. In the example of FIG. 1, a second pair of notches 110(3) and 110(6) are configured to ream a pipe having a second diameter that is equal to the distance between the pair of notches 110(3) and 110(6), a third pair of notches 110(2) and 110(7) are configured to ream a pipe having a third diameter that is equal to the distance between the pair of notches 110(2) and 110(7), and a fourth, outermost pair of notches 110(1) and 110(8) are configured to ream a pipe having a fourth, largest diameter that is equal to the distance between the pair of notches 110(1) and 110(8).

The body 102 may also have one or more annular grooves 114 defined in the planar front surface 108 of the body 102. The example of FIG. 1 shows a body 102 having four annular grooves 114(1), 114(2), 114(3), and 114(4) (collectively 114) that are defined in the planar front surface 108 of the body 102, although any suitable number of annular grooves 114 may be defined in the planar front surface 108 of the body 102, such as a single annular groove 114, or a plurality of annular grooves 114. The annular groove(s) 114 may be concentric with a center 116 of the body 102 and configured to receive an end(s) of a pipe(s) that is/are to be reamed and that has/have a diameter(s) sized to be received within the annular groove(s) 114. The annular grooves(s) 114 may be interrupted by the straight groove 106 that is configured to receive the reaming blade 104.

The straight groove 106 defined in the planar front surface 108 of the body 102 may pass through the center 116 of the body 102, and may intersect the annular groove(s) 114 that are also defined in the planar front surface 108 of the body 102. Additionally, or alternatively, the straight groove 106 may be radially aligned with the center 116 of the body 102, and may intersect the annular groove(s) 114. For instance, the straight groove 106 may or may not pass through the center 116 of the body 102 and be radially aligned with the center 116 of the body 102. FIG. 1 depicts an example where the straight groove 106 is both radially aligned with, and passes through, the center 116 of the body 102. As will be illustrated in further detail in the following figures, the depth of the straight groove 106 may be greater than a depth of an individual annular groove 114. In other words, the annular groove(s) 114 may be shallower than the straight groove 106.

The notches 110 are positioned on the reaming blade 104 to substantially align with a corresponding annular groove 114 when the reaming blade 104 is disposed within the straight groove 106. For example, the pair of notches 110(1) and 110(8) may be positioned to substantially align with the first, largest-diameter annular groove 114(1), the pair of notches 110(2) and 110(7) may be positioned to substantially align with the second annular groove 114(2), the pair of notches 110(3) and 110(6) may be positioned to substantially align with the third annular groove 114(3), and the pair of notches 110(4) and 110(5) may be positioned to substantially align with the fourth, smallest-diameter annular groove 114(4), when the reaming blade 104 is disposed within the straight groove 106. A notch 110 is "substantially aligned" with an annular groove 114 if at least two-thirds of the width of the notch 110 overlaps the width of the annular groove 114. This is perhaps better depicted in FIG. 8, and will be explained again with reference to that figure.

The reaming blade 104 may be secured within the straight groove 106 using one or more fasteners 118, such as one or more set screws, that are fastened (e.g., screwed) into one or more holes 120 that extend from a side surface 122 (e.g., a curved side surface 122, in the case of a cylindrical body 102) of the body 102 to the inner surface of the straight groove 106. In embodiments where the one or more fasteners 118 are set screws, at least a portion of the one or more holes 120 may be threaded. FIG. 1 shows a body 102 having two holes 120(1) and 120(2) (collectively 120) that each extend from the side surface 122 of the body 102 to the straight groove 106, and that are configured to receive two fasteners 118(1) and 118(2) (collectively 118), although any suitable number of holes 120 and fasteners 118 may be implemented, such as a single hole 120 and a single fastener 118, or a plurality of holes 120 and a plurality of fasteners 118. Furthermore, the holes 120 may be offset from the center of the body 102 in opposite directions. For instance, the first hole 120(1) may be offset from the center 116 of the body 102 in a first direction, and the second hole 120(2) may be offset from the center 116 of the body 102 in a second direction that is opposite the first direction. Additionally, or alternatively, the holes 120 may be defined in the body 102 on opposite sides of the straight groove 106. FIG. 1 depicts an example where two holes 120 are defined in the body 102 on a same side of the straight groove 106. It is to be appreciated that, although an example of the fastener(s) 118 is shown as a set screw(s), other fasters can be used to secure the reaming blade 104 within the straight groove 106, such as one or more bolts, clamps, dowels, hooks, keys, latches, lugs, nails, pins, rivets, etc.

The example fastener(s) 118 (e.g., set screws) shown in FIG. 1 are configured to engage with the reaming blade 104 when the reaming blade 104 is disposed within the straight groove 106, such as by impinging, or pressing, upon the reaming blade 104 so that the reaming blade 104 is clamped between the fastener(s) 118 and body 102 at an inner surface of the straight groove 106. This secures the reaming blade 104 to the body 102 so that the reaming blade 104 does not fall out of the straight groove 106 during use. Using multiple fasteners 118, such as the two fasteners 118(1) and 118(2) shown in FIG. 1, may prevent the reaming blade 104 from rotating/swinging about an axis of the fastener 118 if the fastener 118 loosens during use of the reaming apparatus 100, for example.

Figure 2A:
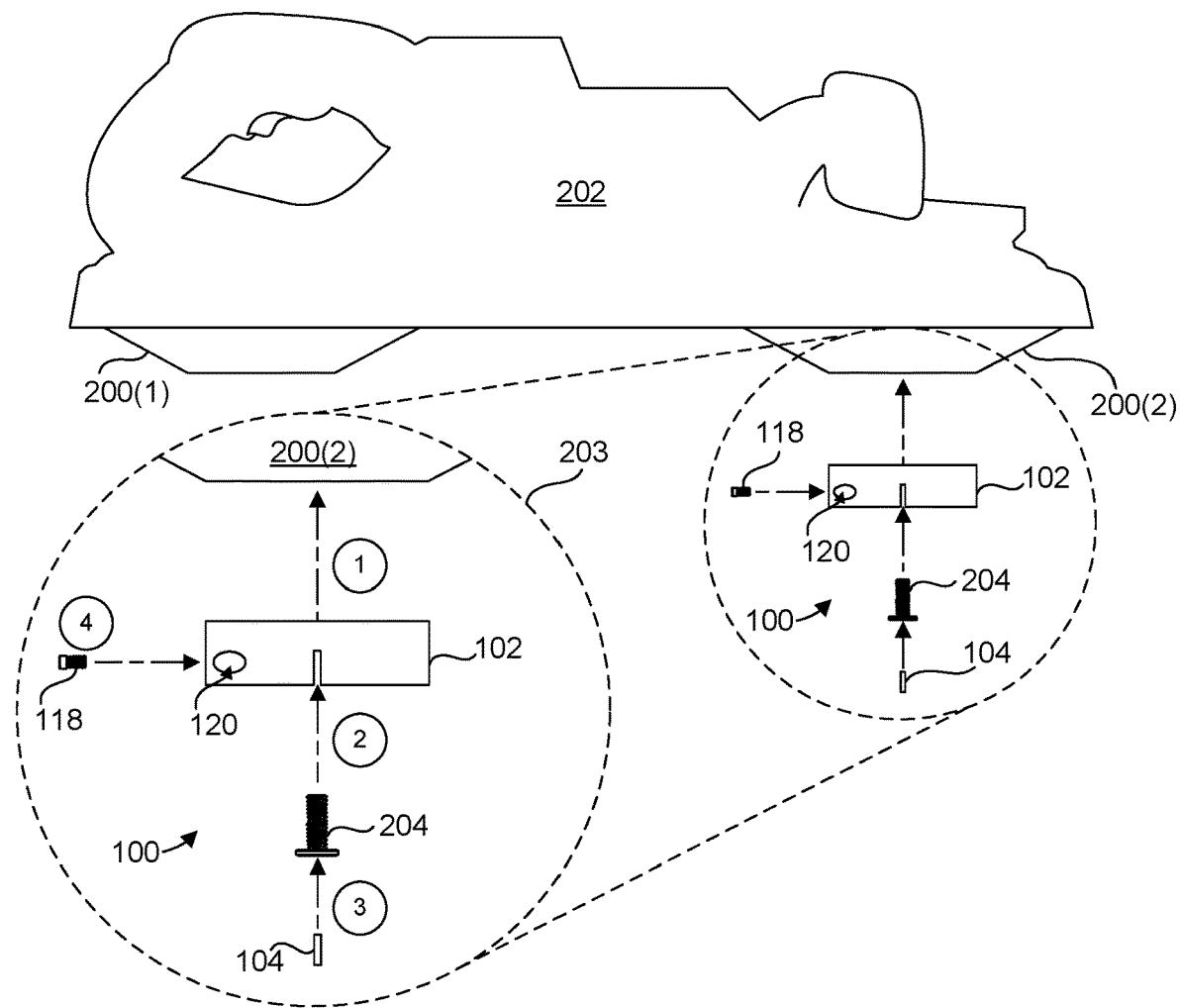
FIG. 2A illustrates a side view of the example reaming apparatus of FIG. 1, and a technique for mounting the reaming apparatus to a pulley of a bandsaw.
Figure 2B:
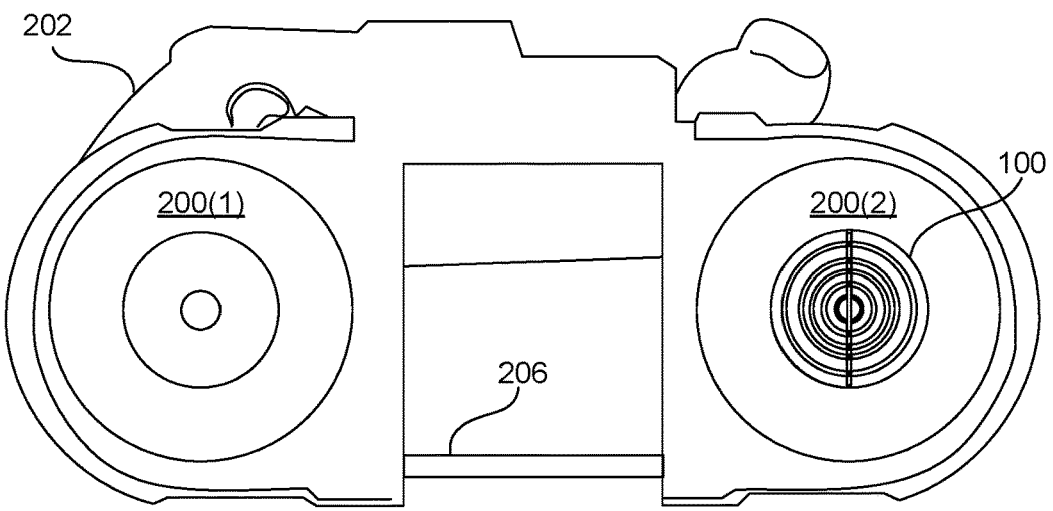
FIG. 2B illustrates a front view of the example reaming apparatus of FIG. 1 mounted to the pulley of the bandsaw of FIG. 2A.

FIG. 2A illustrates a side view of the example reaming apparatus 100 of FIG. 1, and a technique for mounting the reaming apparatus 100 to a pulley 200 of a bandsaw 202. FIG. 2B illustrates a front view of the example reaming apparatus 100 of FIG. 1 mounted to a pulley 200 of the bandsaw 202 of FIG. 2A. Many handsaws 202 (e.g., portable handsaws) have two pulleys 200(1) and 200(2), as shown in the figures herein. The reaming apparatus 100 may include a through hole in the center 116 of the reaming apparatus 100 (as will be shown in the following figures) that can be used to mount the reaming apparatus 100 to either pulley 200(1) or pulley 200(2) of the bandsaw 202. If a user possesses multiple reaming apparatuses 100 that are configured to ream different sizes of pipe, the user may mount two different reaming apparatuses 100 to the bandsaw 202; one reaming apparatus 100 on the first pulley 200(1), and another reaming apparatus 100 on the second pulley 200(2).

Figure 3A:
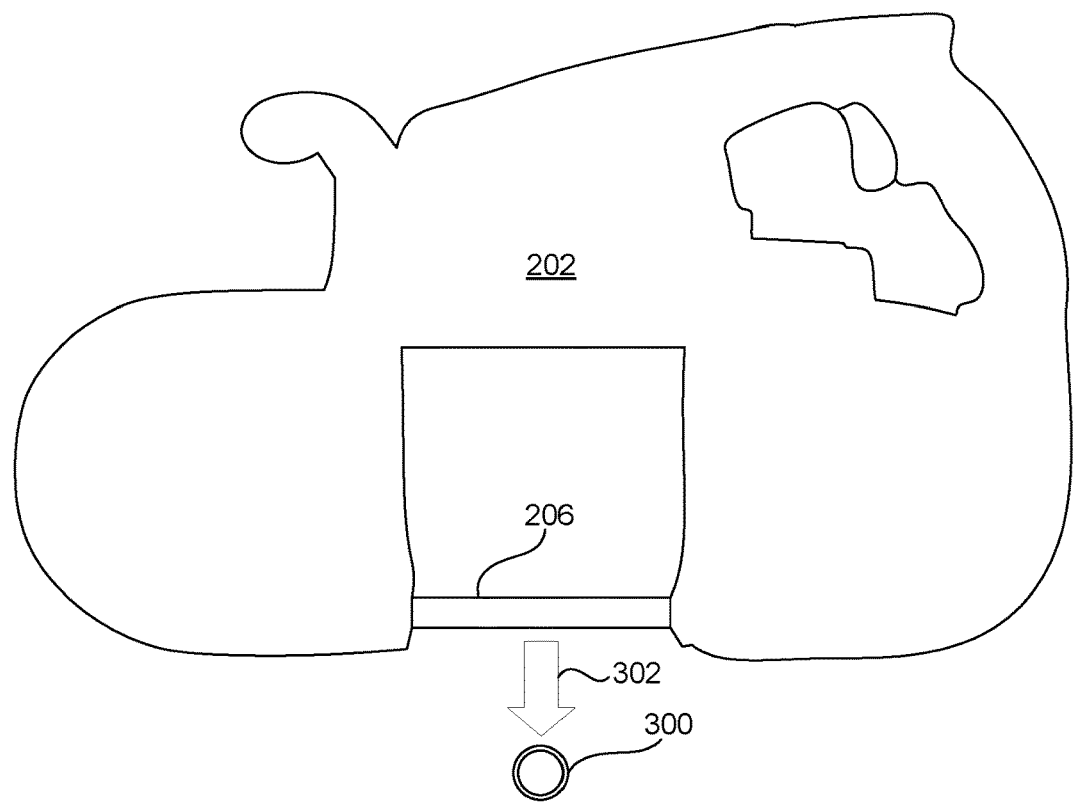
FIG. 3A illustrates a back view of the bandsaw of FIG. 2A with the example reaming apparatus of FIG. 1 mounted to a pulley of the bandsaw on the front of the bandsaw, and a technique for cutting pipe using the bandsaw.

In order to mount the reaming apparatus 100 to a pulley 200 of the bandsaw 202, a user may initially unscrew the fastener(s) 118 (e.g., set screw(s)) and remove the reaming blade 104 from the straight groove 106 of the body 102, thereby exposing a through hole in the center 116 of the reaming apparatus 100. As shown in the zoomed-in view 203 of FIG. 2A, a first mounting step (designated as step "1" in the zoomed-in view 203) may involve a user placing the body 102 of the reaming apparatus 100 on the pulley 200(2) of the bandsaw 202 by aligning the center 116 of the body 102 with a threaded hole in the center of the bandsaw's pulley 200(2) and positioning the body 102 against the pulley 200(2). In a second mounting step (designated as step "2" in the zoomed-in view 203), the user may insert a fastener 204 (e.g., a threaded bolt) into the through hole in the center 116 of the body 102, and may screw the fastener 204 into the threaded hole in the center of the bandsaw's pulley 200(2). In a third mounting step (designated as step "3" in the zoomed-in view 203), the reaming blade 104 can be inserted into the straight groove 106 of the body 102, and in a fourth mounting step (designated as step "4" in the zoomed-in view 203), the fastener(s) 118 can be fastened (e.g., tightened inside the hole(s) 120 of the body 102) to secure the reaming blade 104 to the body 102. In this manner, the reaming apparatus 100 can be mounted to a pulley 200 of the bandsaw 202, whereby the reaming apparatus 100 is concentric with the pulley 200. This is shown in FIG. 2B, where the reaming apparatus 100 is removably mounted to the pulley 200(2) and ready for use in reaming pipe. As shown in FIG. 2B and FIG. 3A, the bandsaw 202 includes a blade 206 that is used to cut through pipe. In this manner, a user is able to cut and ream pipe more efficiently, as compared to using cutting tools with existing hand reamers. Using the reaming apparatus 100 in this manner is depicted in FIGS. 3A and 3B.

FIG. 3A illustrates a back view of the bandsaw 202 of FIG. 2A with the example reaming apparatus 100 of FIG. 1 mounted to a pulley 200(2) of the bandsaw 202 on the front of the bandsaw 202 (which is hidden from view in FIG. 3A), and a technique for cutting pipe 300 using the bandsaw 202. FIG. 3B illustrates a side view of the example reaming apparatus 100 of FIG. 1 mounted to the pulley 200(2) of the bandsaw 202 of FIG. 2A, and a technique for reaming the cut end of the pipe 300 of FIG. 3A to remove burrs from the cut end of the pipe 300.

As shown in FIG. 3A, a user may operate the bandsaw 202 having the reaming apparatus 100 mounted thereto in order to cut a pipe 300 from an existing length to a shorter length. The pipe 300 may represent any suitable type of pipe, such as EMT, PVC, or the like. To cut the pipe 300, if the pipe 300 is not already held in place at one end, the user may clamp the pipe 300 at portion of the pipe that is a distance from the location of the pipe 300 where the cut is to be made in the pipe 300. In some cases, a vise can be used to hold the pipe 300 in place while it is being cut. In some cases, another person may hold the pipe 300 at a safe distance from the location where the cut is to be made in the pipe 300. With the pipe 300 held in place at one end, the user of the bandsaw 202 may bring the blade 206 of the bandsaw into contact with the pipe 300, as shown by the arrow 302 in FIG. 3A, and may pass the blade 206 of the bandsaw 202 all the way through the pipe 300. As mentioned, this may create burrs on the cut end 304 of the pipe 300.

Figure 3B:
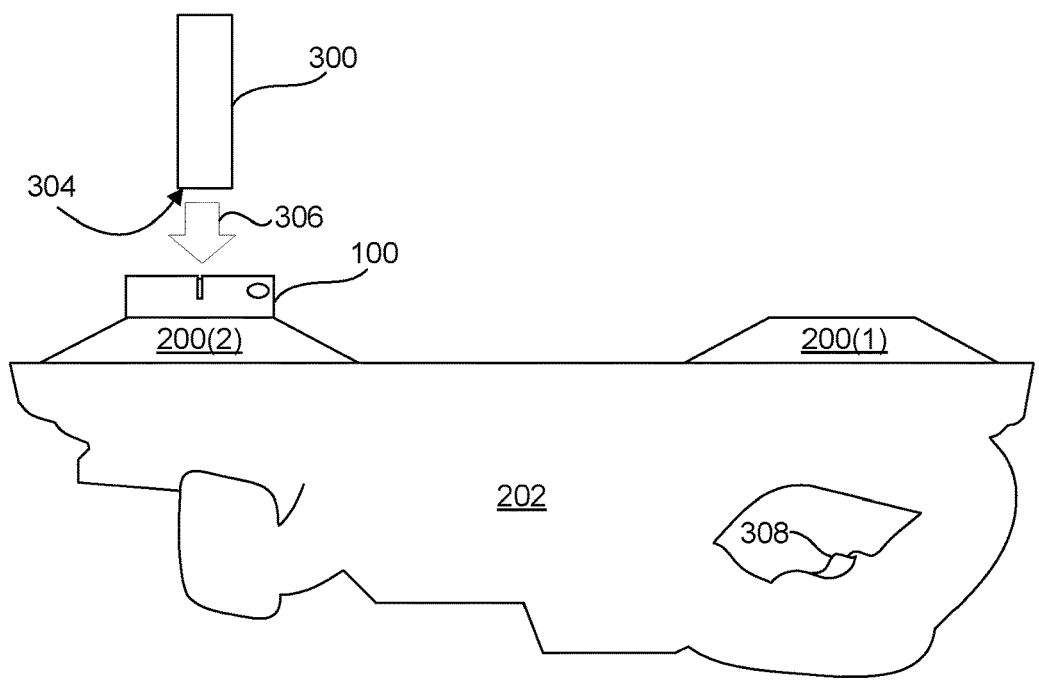
FIG. 3B illustrates a side view of the example reaming apparatus of FIG. 1 mounted to the pulley of the bandsaw of FIG. 2A, and a technique for reaming the cut end of the pipe of FIG. 3A.

As shown in FIG. 3B, after cutting the pipe 300, the user may manipulate, or orient, the bandsaw 202 such that the reaming apparatus 100 is positioned adjacent to the cut end 304 of the pipe 300 with the burrs that are to be removed. The user may align the reaming apparatus 100 and/or the pipe 300 so that the reaming apparatus 100 is concentric with the pipe 300. Assuming an annular groove 114 of the reaming apparatus 100 is sized to receive the pipe 300 of a particular diameter, concentrically aligning the reaming apparatus 100 and the pipe 300 in this way ensures that the annular groove 114 corresponding to the diameter of the pipe 300 is positioned to receive the cut end 304 of the pipe 300 within the annular groove 114. As shown by the arrow 306 in FIG. 3B, the user can move the bandsaw 202 and/or the pipe 300 to decrease the distance between the reaming apparatus 100 and the pipe 300 until the cut end 304 of the pipe is engaged with, or otherwise received within, the corresponding annular groove 114 of the reaming apparatus 100, and the notches 110 of the reaming blade 104 are in contact with the inner edge and outer edge of the pipe 300 at the cut end 304. The user can power on the bandsaw 202 by pulling a trigger 308 to rotate the pulleys 200 of the bandsaw 202, which, in turn, rotates the reaming apparatus 100. While the pipe 300 is engaged with the reaming apparatus 100 and while the reaming apparatus 100 rotates under the power of the bandsaw 202, the reaming blade 104 deburrs the cut end of the pipe 300 by virtue of the notches 110 in contact with the inner and outer edges of the pipe 300 revolving around the cut end 304 of the pipe 300.

Thus, the operation of the bandsaw 202 with the reaming apparatus 100 coupled thereto, as depicted in FIGS. 3A and 3B, allows a user to quickly and efficiently cut and ream pipe 300 using a single tool (i.e., a bandsaw 202 having the reaming apparatus 100 coupled thereto), and to do so without having to set down the bandsaw 202 when transitioning from cutting to reaming. This is especially useful in situations where the user might be on a ladder, cutting pipe that is located on the ceiling of a building. In this situation, the user does not have to climb down the ladder after cutting the pipe with the bandsaw 202, or set the bandsaw 202 precariously on the top of the ladder, or hand the bandsaw 202 to an apprentice standing beside the ladder. Instead, the user can seamlessly cut and ream the pipe 300 on the ceiling using the same tool, without having to set the tool down in between cutting and reaming operations. This allows for a shorter, faster installation of pipe 300, which ultimately increases the profitability of a construction project. The use of the reaming apparatus 100 in this manner also reduces hand fatigue that can result from frequently using a hand reamer.

Figure 4:
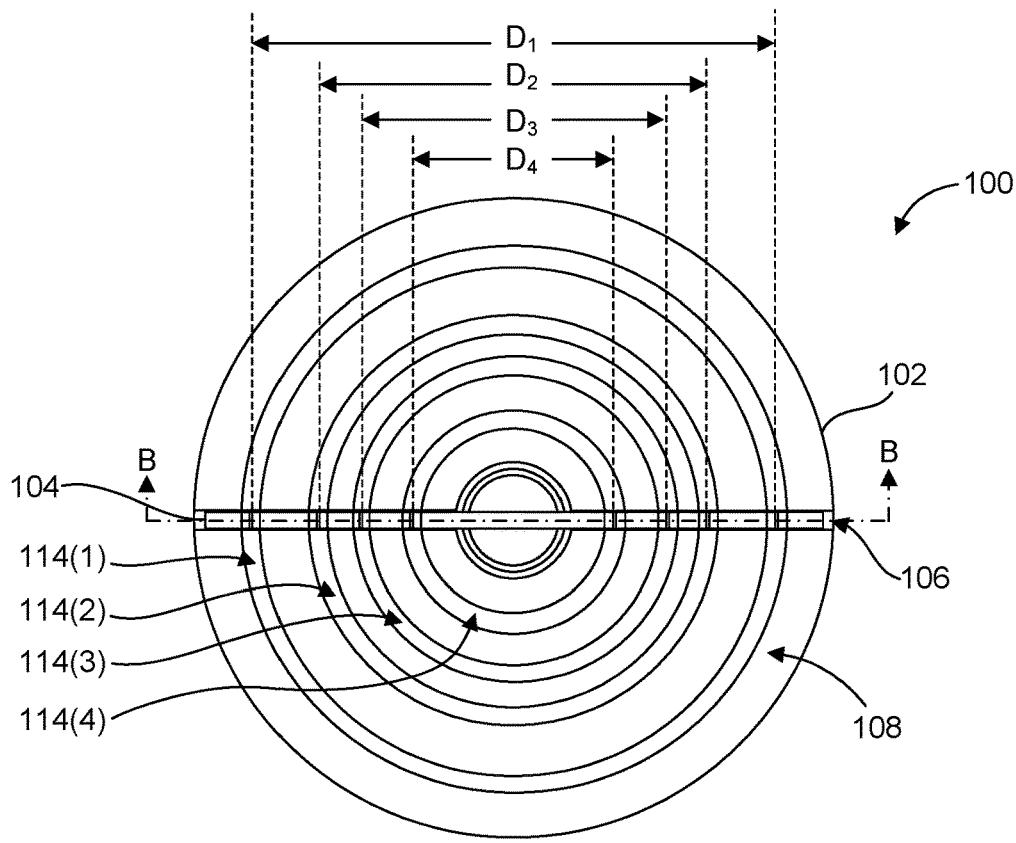
FIG. 4 illustrates a front view of the example reaming apparatus of FIG. 1.

FIG. 4 illustrates a front view of the example reaming apparatus 100 of FIG. 1. The annular grooves 114(1)-(4) defined in the planar front surface 108 of the body 102 are shown in FIG. 4 to be concentric with the center 116 of the body 102 of the reaming apparatus 100. The annular grooves 114 may get progressively smaller in diameter from the periphery of the body 102 to the center 116 of the body 102. For example, the first annular groove 114(1) may have a first diameter, $D_i$, that is a largest diameter among the plurality of annular grooves 114(1)-(4), the second annular groove 114(2) may have a second diameter, $D_2$, that is a next largest diameter among the plurality of annular grooves 114(1)-(4), the third annular groove 114(3) may have a third diameter, $D_3$, that is a next smallest diameter among the plurality of annular grooves 114(1)-(4), and the fourth annular groove 114(4) may have a fourth diameter, $D_4$, that is a smallest diameter among the plurality of annular grooves 114(1)-(4). In some embodiments, the first diameter, $D_1$, may be about 2.88 inches, which may be suitable for reaming EMT having a 2½ inch trade size. In some embodiments, the second diameter, $D_2$, may be about 2.14 inches, which may be suitable for reaming EMT having a 2-inch trade size. In some embodiments, the third diameter, $D_3$, may be about 1.67 inches, which may be suitable for reaming EMT having a 1½ inch trade size. In some embodiments, the fourth diameter, $D_4$, may be about 1.1 inches, which may be suitable for reaming EMT having a 1-inch trade size. The spacing, or distance, between pairs of notches 110 of the reaming blade 104 may be about equal to the respective diameters of the annular grooves 114. For example, a first pair of notches 110(4) and 110(5) may be spaced apart from each other by a distance that is about equal to the fourth diameter, $D_4$, of the fourth annular groove 114(4), a second pair of notches 110(3) and 110(6) may be spaced apart from each other by a distance that is about equal to the third diameter, $D_3$, of the third annular groove 114(3), a third pair of notches 110(2) and 110(7) may be spaced apart from each other by a distance that is about equal to the second diameter, $D_2$, of the second annular groove 114(2), and a fourth, outermost pair of notches 110(1) and 110(8) may be spaced apart from each other by a distance that is about equal to the first diameter, $D_1$, of the first annular groove 114(1).

Figure 5:
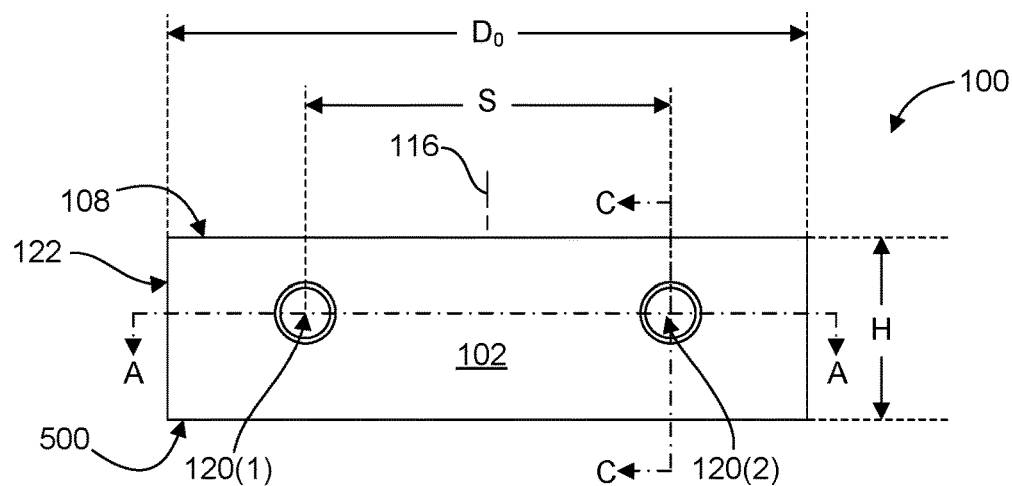
FIG. 5 illustrates a side view of the example reaming apparatus of FIG. 1.

FIG. 5 illustrates a side view of the example reaming apparatus of FIG. 1. FIG. 5 shows the body 102 of the reaming apparatus 100 as having a diameter, $D_0$, and a height, H. In some embodiments, the height, H, of the body 102, as measured from the planar front surface 108 of the body 102 to the planar back surface 500 of the body, is less than the diameter, $D_0$, of the body 102. In other words, the body 102 may be wider than it is tall. This design minimizes the amount by which the reaming apparatus 100 extends from the bandsaw 202, when the reaming apparatus 100 is mounted to the bandsaw 202, which mitigates injury during use, as compared to a taller reaming apparatus 100. As mentioned, in some embodiments, the diameter, $D_0$, of the body 102 may be about 3.5 inches, which is suitable for reaming the range of EMT sizes noted above, or any size pipe that is less than 3.5 inches in diameter, for that matter.

FIG. 5 also illustrates the one or more holes 120 that each extend from the side surface 122 of the body 102 to the straight groove 106 where the reaming blade 104 can be disposed. FIG. 5 illustrates an example with two holes 120(1) and 120(2), which are configured to receive two corresponding fasteners 118(1) and 118(2), such as set screws, or any other suitable type of fastener. In the two-hole 120 configuration, the holes 120(1) and 120(2) may be equidistant from the center 116 of the body, with a first hole 120(1) being offset from the center 116 in a first direction, and a second hole 120(2) being offset from the center 116 in a second direction opposite the first direction. This allows for securing the reaming blade 104 within the straight groove 106 by pinching or clamping the reaming blade 104 against the body 102 at two locations that are on opposite sides of the center 116 of the body 102, which may help to keep the reaming blade 104 from pivoting or swinging out of the straight groove 106 during use. Furthermore, as mentioned above, although the holes 120(1) and 120(2) are shown as being defined in the body 102 on a common side of the straight groove 106, the body 102 may have a first hole 120(1) on one side of the straight groove 106 and a second hole 120(2) on the other side of the straight groove 106 so that the reaming blade 104 is removably secured to the body 102 by the first fastener 118(1) from one side of the reaming blade 104, and is removably secured to the body 102 by the second fastener 118(2) from the opposite side of the reaming blade 104. FIG. 5 also shows a distance, S, between the two holes 120(1) and 120(2). In some embodiments, the distance, S, may be about 2 inches. The hole(s) 120 may be positioned close to a middle of the body 102, but within a front half of the body 102 (e.g., between the middle of the body 102 and the planar front surface 108 of the body 102). In other words, the hole(s) 120 may be positioned slightly closer to the planar front surface 108 than the planar back surface 500. This positioning of the hole(s) 120 closer to the planer front surface 108 than the planar back surface 500 may be to accommodate a recessed area in the planar back surface 500, as shown in FIG. 6, among other figures.

Figure 6:
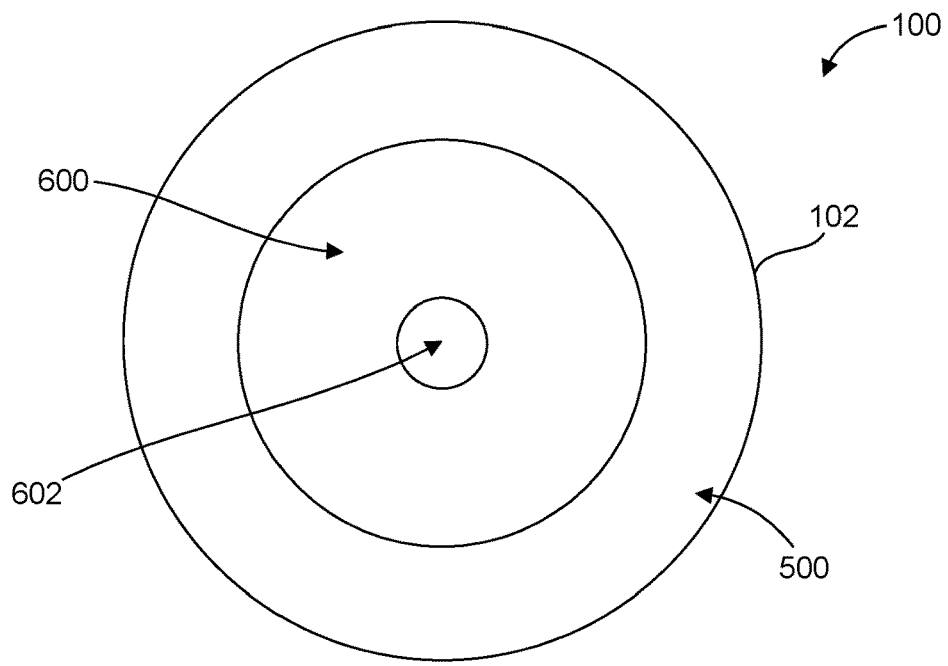
FIG. 6 illustrates a back view of the example reaming apparatus of FIG. 1.

FIG. 6 illustrates a back view of the example reaming apparatus 100 of FIG. 1. A recessed area 600 defined in the planar back surface 500 of the body 102 is shown in FIG. 6 to be at the center 116 of the body 102 of the reaming apparatus 100 and, thus, concentric with the center 116 of the body 102. The recessed area 600 can be generally circular in shape to accommodate mounting the reaming apparatus 100 to different types or brands of bandsaws 202. That is, different types or brands of bandsaws 202 may have different pulley 200 designs—some have projections or other features at the center of the pulley 200, and others may not have any projections. The recessed area 600 provides space to accommodate projections or other features at the center of the bandsaw's pulley 200 so that the reaming apparatus 100 becomes a universal reaming adapter for many different types, brands, or models of bandsaws 202.

FIG. 6 also shows the aforementioned through hole 602 at the center 116 of the body 102 of the reaming apparatus 100. The diameter of the through hole 602 at the planar back surface 500 of the body 102 may be less than the diameter of the through hole 602 at the planar front surface 108 of the body 102. For example, the through hole 602 may neck down to a smaller diameter at the planar back surface 500. This is so that the fastener 204 can be used to mount the reaming apparatus 100 to a bandsaw 202, and so that the appropriately-sized fastener 204 is unable to pass all the way through the through hole 602.

Figure 7:
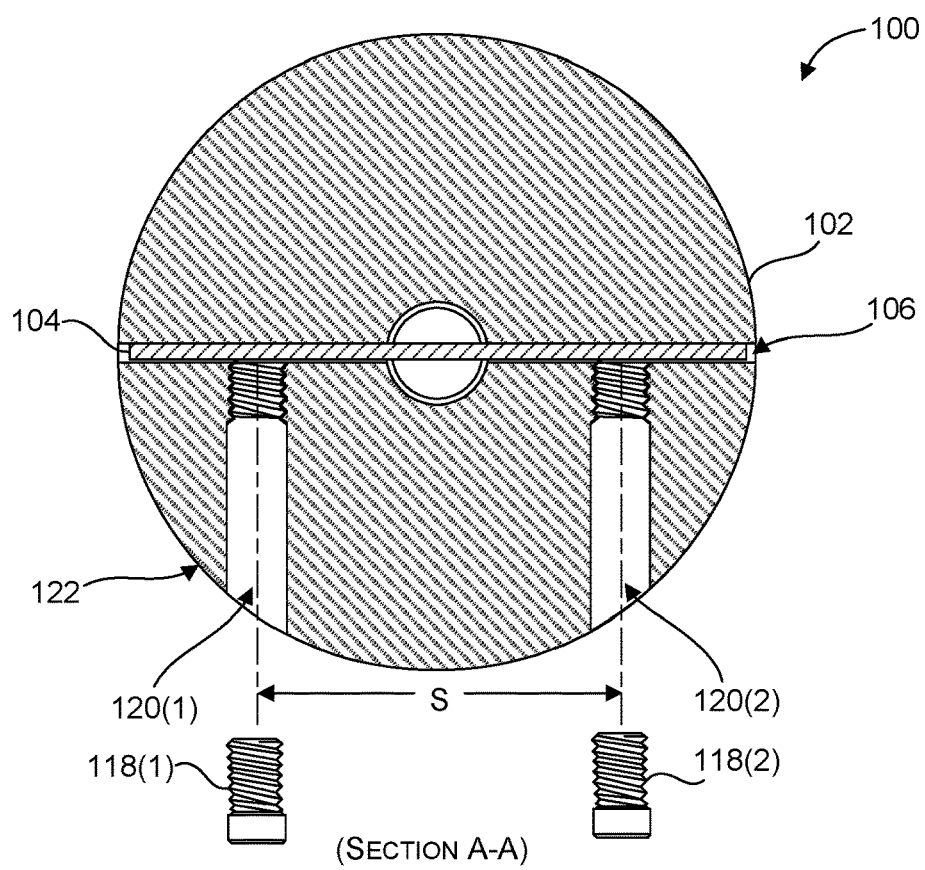
FIG. 7 illustrates a cross-sectional view of the example reaming apparatus of FIG. 1, taken along section line A-A, as shown in FIG. 5.

FIG. 7 illustrates a cross-sectional view of the example reaming apparatus 100 of FIG. 1, taken along section line A-A, as shown in FIG. 5. The cross-sectional view of FIG. 7 illustrates how the one or more holes 120 defined in the side surface 122 of the body 102 each extend from the side surface 122 of the body 102 to the straight groove 106 where the reaming blade 104 can be disposed. FIG. 7 illustrates the running example with two holes 120(1) and 120(2), which are configured to receive two corresponding fasteners 118(1) and 118(2), such as set screws, or any other suitable type of fastener. As mentioned, in the two-hole 120 configuration, the holes 120(1) and 120(2) may be equidistant from the center 116 of the body, with a first hole 120(1) being offset from the center 116 in a first direction, and a second hole 120(2) being offset from the center 116 in a second direction opposite the first direction. Furthermore, as mentioned above, although the holes 120(1) and 120(2) are shown as being defined in the body 102 on a common side of the straight groove 106, the body 102 may have a first hole 120(1) on one side of the straight groove 106 and a second hole 120(2) on the other side of the straight groove 106 so that the reaming blade 104 is removably secured to the body 102 by the first fastener 118(1) from one side of the reaming blade 104, and is removably secured to the body 102 by the second fastener 118(2) from the opposite side of the reaming blade 104. In this alternative configuration, the holes 120(1) and 120(2) can be radially aligned with the center 116 of the body 102. FIG. 7 also shows the distance, S, between the two holes 120(1) and 120(2), which, in some embodiments, can be about 2 inches.

Figure 8:
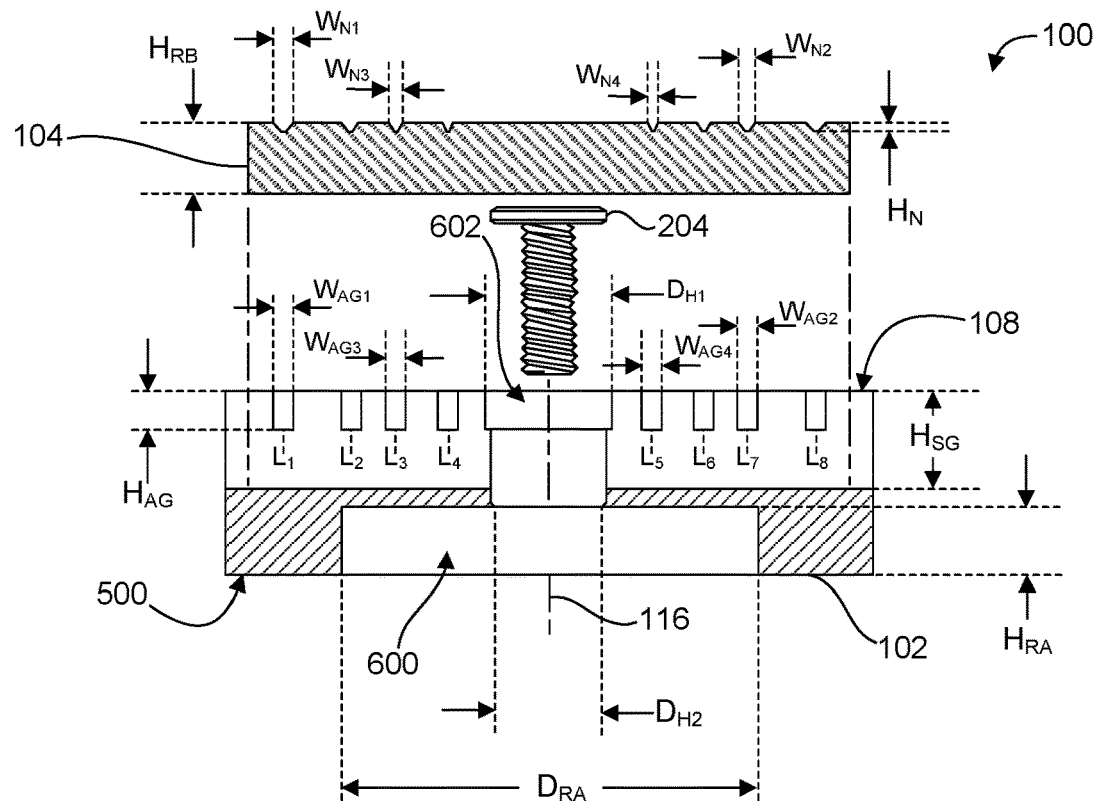
FIG. 8 illustrates a cross-sectional view of the example reaming apparatus of FIG. 1, taken along section line B-B, as shown in FIG. 4.

FIG. 8 illustrates a cross-sectional view of the example reaming apparatus 100 of FIG. 1, taken along section line B-B, as shown in FIG. 4. In the cross-sectional view of FIG. 8, the reaming blade 104 and fastener 204 are shown in an exploded view, apart from the body 102 of the reaming apparatus 100. As shown in FIG. 8, the through hole 602 at the center 116 of the body 102 may have a first diameter, $D_{H1}$, at the planar front surface 108 of the body 102 and a second diameter, $D_{H2}$, at the recessed area 600 of the planar back surface 500 of the body 102, and the second diameter, $D_{H2}$, may be less than the first diameter, $D_{H1}$. In some embodiments, the second diameter, $D_{H2}$, of the through hole 602 may be about ½ inch or less. In some embodiments, the first diameter, $D_{H1}$, of the through hole 602 may be about 0.6 inches or greater. In some embodiments, the through hole 602 can neck down from a larger diameter to the smaller, second diameter, $D_{H2}$, at the recessed area 600 of the planar back surface 500 of the body 102. In this manner, the fastener 204, such as a threaded bolt, can be inserted into the through hole 602, yet retained in the through hole 602 by having a head that is between the first diameter, $D_{H1}$, and the second diameter, $D_{H2}$, of the through hole 602. This allows for mounting the body 102 of the reaming apparatus 100 to a pulley 200 of a bandsaw 202 using the fastener 204.

The recessed area 600 at the center 116 of the body 102 that is defined in the planar back surface 500 of the body 102 may have a diameter, $D_{RA}$, that is about 2.25 inches. The recessed area 600 may also have a depth, $H_{RA}$, of about 0.38 inches. This accommodates many different types, brands, or models of bandsaws 202 so that the reaming apparatus 100 can be mounted to a variety of different bandsaws 202.

FIG. 8 also shows that the annular grooves 114 that are defined in the planar front surface 108 of the body 102 each have a width, $W_{AG}$, and a depth, $H_{AG}$. In some embodiments, multiple annular grooves 114 in the body 102 may have a common, or a same, depth, $H_{AG}$. In some embodiments, the width, $W_{AG}$, of the annular grooves 114 can vary. For example, the first annular groove 114(1) (See FIG. 1) may have a first width, $W_{AG1}$, and this first width, $W_{AG1}$, may be the widest among the multiple annular grooves 114 to accommodate a relatively large-diameter pipe that has a greater wall thickness than relatively small-diameter pipe. Accordingly, the second annular groove 114(2) (See FIG. 1) may have a second width, $W_{AG2}$, and this second width, $W_{AG2}$, may be different than (e.g., less than) the first width, $W_{AG1}$. Similarly, the third annular groove 114(3) (See FIG. 1) may have a third width, $W_{AG3}$, and this third width, $W_{AG3}$, may be different than (e.g., less than) the second width, $W_{AG2}$. Finally, the fourth annular groove 114(4) (See FIG. 1) may have a fourth width, $W_{AG4}$, and this fourth width, $W_{AG4}$, may be different than (e.g., less than) the third width, $W_{AG3}$. In some embodiments, the multiple annular grooves 114 have a common, or a same, width, $W_{AG}$, such as a width, $W_{AG}$, that is large enough to accommodate a thickness of a pipe that is sized to be received in the outermost annular groove 114(1).

As shown in FIG. 8, the plurality of notches 110 defined in the planar front surface 112 of the reaming blade 104 (See FIG. 1) each have a width, $W_N$, and a depth, $H_N$. In some embodiments, multiple notches 110 in the reaming blade 104 may have a common, or a same, depth, $H_N$. In some embodiments, the width, $W_N$, of the notches 110 can vary. For example, the first notch 110(1) and the eighth notch 110(8) (See FIG. 1) may have a first width, $W_{N1}$, and this first width, $W_{N1}$, may be the widest among the multiple notches 110 to ream a relatively large-diameter pipe that has a greater wall thickness than relatively small-diameter pipe. Accordingly, the second notch 110(2) and the seventh notch 110(7) (See FIG. 1) may have a second width, $W_{N2}$, and this second width, $W_{N2}$, may be different than (e.g., less than) the first width, $W_{N1}$. Similarly, the third notch 110(3) and the sixth notch 110(6) (See FIG. 1) may have a third width, $W_{N3}$, and this third width, $W_{N3}$, may be different than (e.g., less than) the second width, $W_{N2}$. Finally, the fourth notch 114(4) and the fifth notch 110(5) (See FIG. 1) may have a fourth width, $W_{N4}$, and this fourth width, $W_{N4}$, may be different than (e.g., less than) the third width, $W_{N3}$. In some embodiments, the multiple notches 110 have a common, or a same, width, $W_N$, at the planar front surface 112 of the reaming blade 104, but a steeper or shallower slope to the v-shape cutout to ream pipes of different diameters. The widths, $W_N$, need not be the same as the widths, $W_{AG}$, but they can be. For example, the width, $W_{N1}$, of the first notch 110(1) and the eighth notch 110(8) of the reaming blade 104 may be substantially equal to the width, $W_{AG1}$, of the first annular groove 114(1), and so on for the remaining notches 110 and annular grooves 114 that are aligned with each other when the reaming blade 104 is disposed within the straight groove 106.

The cross-sectional view of FIG. 8, in conjunction with FIG. 1, also shows locations, L, where the straight groove 106 intersects the annular grooves 114 of the body 102. For example, the straight groove 106 may intersect the first, outermost annular groove 114(1) at a first location, $L_1$, of the annular groove 114(1) and at a second location, $L_8$, of the annular groove 114(1). Furthermore, the first notch 110(1) of the reaming blade 104 is positioned on the reaming blade 104 to substantially align with the annular groove 114(1) at the first location, $L_1$, of the annular groove 114(1) when the reaming blade 104 is disposed within the straight groove 106, while an eighth notch 110(8) of the reaming blade 104 is positioned on the reaming blade 104 to substantially align with the annular groove 114(1) at the second location, $L_8$, of the annular groove 114(1) when the reaming blade 104 is disposed within the straight groove 106. Similarly, the straight groove 106 may intersect the second annular groove 114(2) at a first location, $L_2$, of the annular groove 114(2) and at a second location, $L_7$, of the annular groove 114(2). Furthermore, the second notch 110(2) of the reaming blade 104 is positioned on the reaming blade 104 to substantially align with the annular groove 114(2) at the first location, $L_2$, of the annular groove 114(2) when the reaming blade 104 is disposed within the straight groove 106, while a seventh notch 110(7) of the reaming blade 104 is positioned on the reaming blade 104 to substantially align with the annular groove 114(2) at the second location, $L_7$, of the annular groove 114(2) when the reaming blade 104 is disposed within the straight groove 106. Similarly, the straight groove 106 may intersect the third annular groove 114(3) at a first location, $L_3$, of the annular groove 114(3) and at a second location, $L_6$, of the annular groove 114(3). Furthermore, the third notch 110(3) of the reaming blade 104 is positioned on the reaming blade 104 to substantially align with the annular groove 114(3) at the first location, $L_3$, of the annular groove 114(3) when the reaming blade 104 is disposed within the straight groove 106, while a sixth notch 110(6) of the reaming blade 104 is positioned on the reaming blade 104 to substantially align with the annular groove 114(3) at the second location, $L_6$, of the annular groove 114(3) when the reaming blade 104 is disposed within the straight groove 106. Finally, the straight groove 106 may intersect the fourth annular groove 114(4) at a first location, $L_4$, of the annular groove 114(4) and at a second location, $L_5$, of the annular groove 114(4). Furthermore, the fourth notch 110(4) of the reaming blade 104 is positioned on the reaming blade 104 to substantially align with the annular groove 114(4) at the first location, $L_4$, of the annular groove 114(4) when the reaming blade 104 is disposed within the straight groove 106, while a fifth notch 110(5) of the reaming blade 104 is positioned on the reaming blade 104 to substantially align with the annular groove 114(4) at the second location, $L_5$, of the annular groove 114(4) when the reaming blade 104 is disposed within the straight groove 106. A notch 110 is "substantially aligned" with an annular groove 114 if at least two-thirds of the width, $W_N$, of the notch 110 overlaps the width, $W_{AG}$, of the annular groove 114. Preferably 100% of the width, $W_N$, of the notch 110 overlaps the width, $W_{AG}$, of the annular groove 114 when the reaming blade 104 is disposed within the straight groove 106. That said, a pipe may still be reamed on at least one edge (e.g., the inner edge or the outer edge of the pipe) if there is as little as two-thirds of the width, $W_N$, of the notch 110 that overlaps the width, $W_{AG}$, of the annular groove 114, and, in this case, the notch 110 may still be considered to be substantially aligned with the annular groove 114.

The cross-sectional view of FIG. 8 further shows that the straight groove 106 has a depth, $H_{SG}$, and that the reaming blade 104 has a height, $H_{RB}$. The depth, $H_{SG}$, of the straight groove 106 may be greater than a height, $H_{RB}$, of the reaming blade 104 such that the reaming blade 104 does not extend beyond the planar front surface 108 of the body 102 when the reaming blade 104 is disposed within the straight groove 106. This design is for optimized safety when using the reaming apparatus 100 on a bandsaw 202. At the high RPM of a rotating bandsaw 202, an apparatus with cutting blades that are exposed and able to cut the user could be dangerous. The disclosed reaming apparatus 100 has a reaming blade 104 that is recessed below the planar front surface 108 of the body 102 of the reaming apparatus 100 such that the reaming blade 104 itself cannot cut or otherwise harm the user during operation. In some embodiments, the depth, $H_{SG}$, of the straight groove 106 is about 0.53 inches, and the height, HRB, of the reaming blade 104 is no greater than about 0.53 inches, or less than 0.5 inches.

Figure 9:
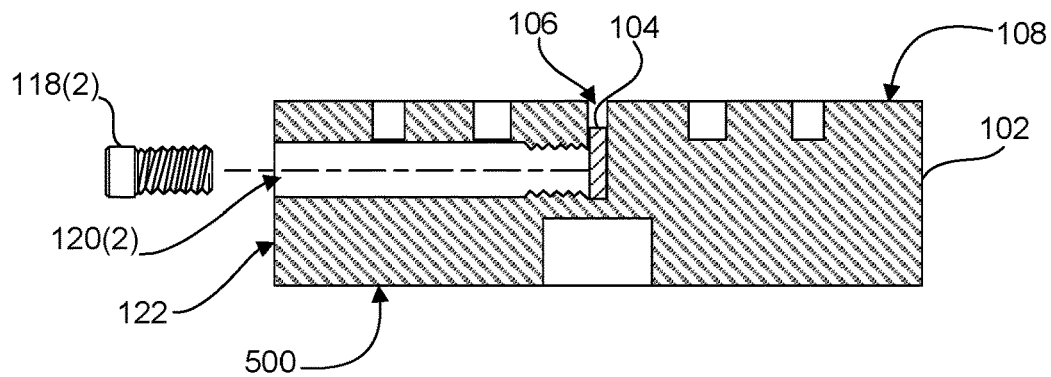
FIG. 9 illustrates a cross-sectional view of the example reaming apparatus of FIG. 1, taken along section line C-C, as shown in FIG. 5.

FIG. 9 illustrates a cross-sectional view of the example reaming apparatus 100 of FIG. 1, taken along section line C-C, as shown in FIG. 5. The cross-sectional view of FIG. 9 illustrates, from yet another viewpoint, how the one or more holes 120 defined in the side surface 122 of the body 102 each extend from the side surface 122 of the body 102 to the straight groove 106 where the reaming blade 104 can be disposed. FIG. 9 illustrates how the hole 120(2) is configured to receive a corresponding fastener 118(2), such as a set screw, or any other suitable type of fastener. As mentioned above, multiple holes 120, such as the holes 120(1) and 120(2) shown in the previous figures, may be defined in the body 102 on a common side of the straight groove 106, as is the case in FIG. 9. However, in some embodiments, the body 102 may have a first hole 120(1) on one side of the straight groove 106 (e.g., the right side of the straight groove 106 in FIG. 9) and a second hole 120(2) on the other side of the straight groove 106 (e.g., the left side of the straight groove 106 in FIG. 9) so that the reaming blade 104 is removably secured to the body 102 by the first fastener 118(1) from one side of the reaming blade 104, and is removably secured to the body 102 by the second fastener 118(2) from the opposite side of the reaming blade 104. FIG. 9 also shows how the one or more holes 120, such as the hole 120(2), can be positioned near the middle of the body 102, and perhaps in the front half of the body 102 (e.g., closer to the planar front surface 108 of the body 102 than the planar back surface 500 of the body 102).

Figure 10:
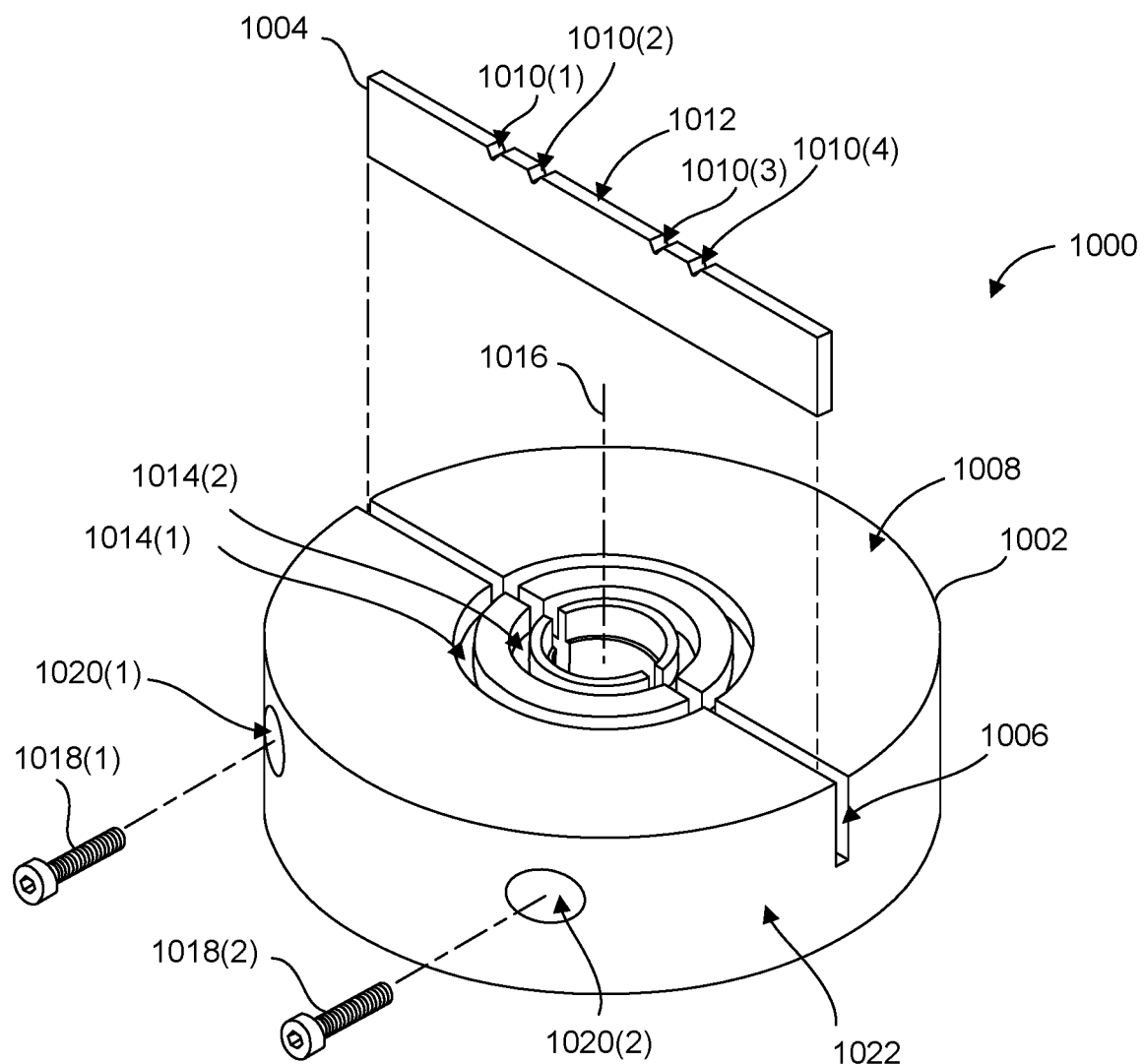
FIG. 10 illustrates a perspective view of an example reaming apparatus according to embodiments disclosed herein.

FIG. 10 illustrates a perspective view of an example reaming apparatus 1000 according to embodiments disclosed herein. The design of the reaming apparatus 1000, while similar to the reaming apparatus 100 of FIG. 1, is different at least in the number of annular grooves 1014 that are defined in the planar front surface 1008 of the body 1002. For example, while the body 102 of the reaming apparatus 100 of FIG. 1 is shown as having four annular grooves 114(1), 114(2), 114(3), and 114(4), the body 1002 of the reaming apparatus 1000 of FIG. 10 is shown as having two annular grooves 1014(1) and 1014(2). In general, a reaming apparatus 100/1000 with a plurality of annular grooves 114/1014 defined in the planar front surface 108/1008 allows for reaming pipes having different diameters. Accordingly, the reaming apparatus 100/1000 is universal in this sense, by being configured to ream pipe over a range of diameters. However, due to limitations in how closely together the annular grooves 114/1014 can be made in the planar front surface 108/1008, it may be beneficial to have the reaming apparatus 1000 in addition to the reaming apparatus 100 if, for example, the annular grooves 1014 have respective diameters that are unique compared to the diameters of the annular grooves 114 of the reaming apparatus 100. For example, the first annular groove 1014(1) of the body 1002 may have a first diameter that is about 1.44 inches, which may be suitable for reaming EMT having a 1¼ inch trade size, and the second annular groove 1014(2) of the body 1002 may have a second diameter that is about 0.87 inches, which may be suitable for reaming EMT having a ¾ inch trade size. In other words, the reaming apparatus 1000 may be configured to ream pipe having diameters that the reaming apparatus 100 is unable to ream. Other aspects of the reaming apparatus 1000 shown in FIG. 10 with like numerals to those in FIG. 1 are not explained in detail for the sake of brevity, as reference can be made to the description of FIG. 1 for the like numerals in FIG. 10.

Figure 11:
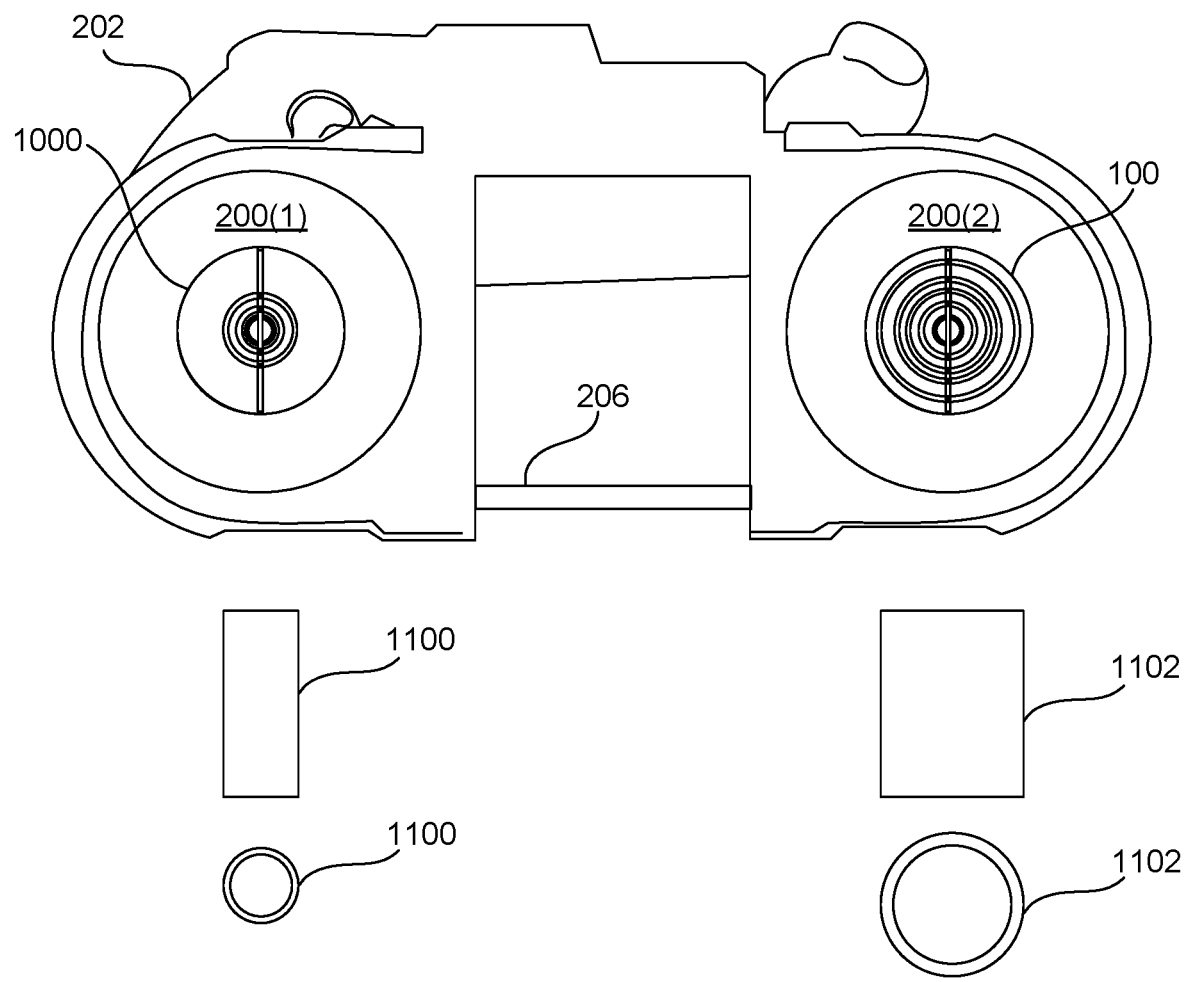
FIG. 11 illustrates a front view of the example reaming apparatus of FIG. 1 and the example reaming apparatus of FIG. 10 mounted to respective pulleys of the bandsaw of FIG. 2A.

FIG. 11 illustrates a front view of the example reaming apparatus 100 of FIG. 1 and the example reaming apparatus 1000 of FIG. 10 mounted to respective pulleys 200 of the bandsaw 202 of FIG. 2A. For example, the reaming apparatus 1000 can be removably mounted to a first pulley 200(1) of the bandsaw 202 and the reaming apparatus 100 can be removably mounted to a second pulley 200(2) of the bandsaw 202. Having two reaming apparatuses 100 and 1000 mounted to the same bandsaw 202 in this manner provides more versatility to the user in terms of being able to ream more sizes of pipes. For example, the user of the bandsaw 202 can cut and ream a first pipe 1100 having a first diameter using the blade 206 and the reaming apparatus 1000, which has an annular groove 1014 sized to receive the pipe 1100, and the user of the bandsaw 202 can also cut and ream a second pipe 1102 having a second diameter larger than the first diameter of the first pipe 1100 using the blade 206 and the reaming apparatus 100. In addition, each reaming apparatus 100 and 1000 can have multiple annular grooves 114 and 1014, respectively, such that each reaming apparatus 100/1000 can ream pipes of different sizes. Thus, the operation of the bandsaw 202 with both reaming apparatuses 100 and 1000 coupled thereto, as depicted in FIG. 11, allows a user to quickly and efficiently cut and ream pipe 1100 and 1102 using a single tool (i.e., a bandsaw 202 having the reaming apparatuses 100 and 1000 coupled thereto), and to do so without having to set down the bandsaw 202 when transitioning from cutting to reaming.

The processes described herein are illustrated as a collection of blocks in a logical flow graph, which represent a sequence of operations. The order in which the operations are described is not intended to be construed as a limitation, and any number of the described blocks can be combined in any order and/or in parallel to implement the processes.

Figure 12:
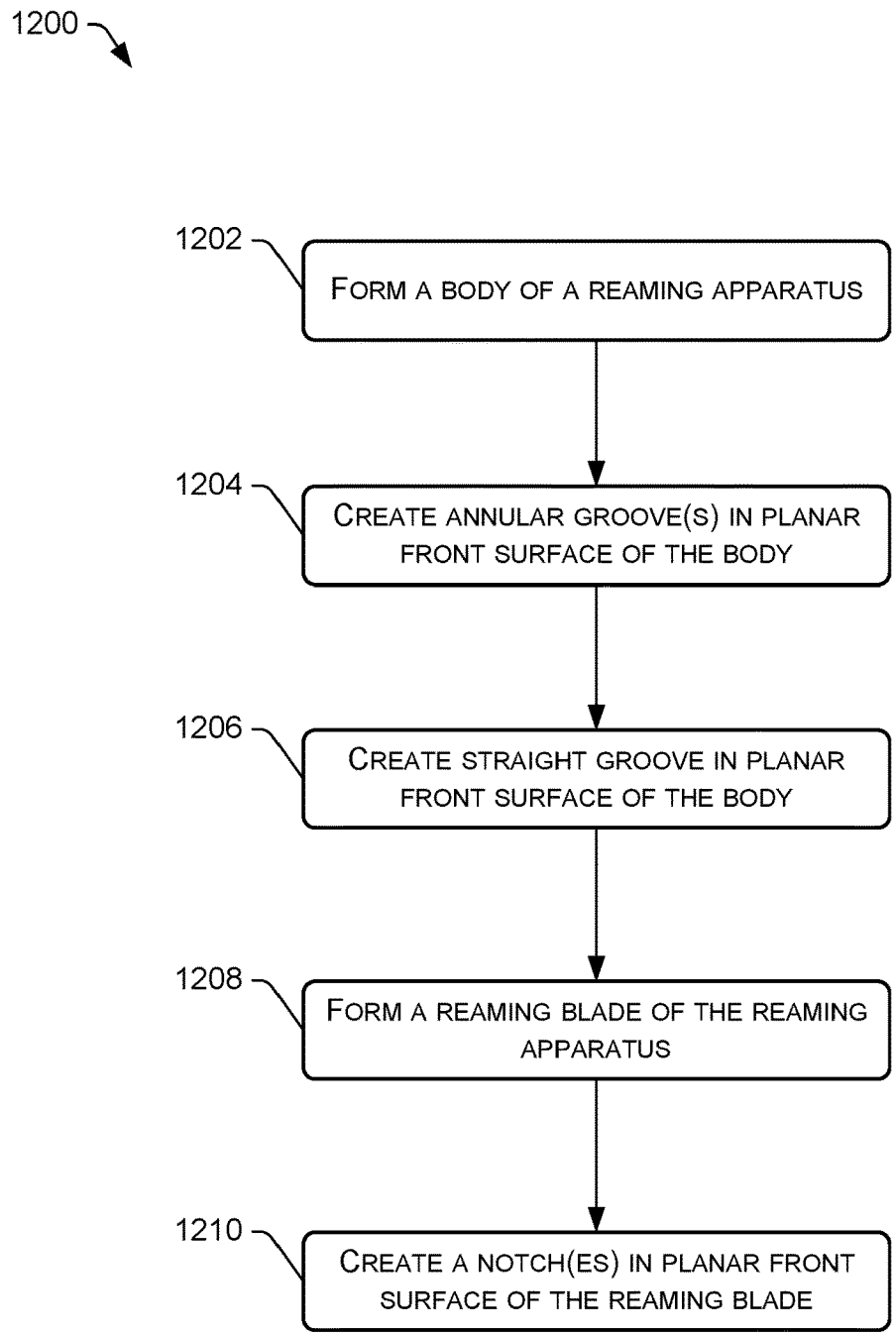
FIG. 12 is a flow diagram of an example process for manufacturing a reaming apparatus, according to embodiments disclosed herein.

FIG. 12 is a flow diagram of an example process 1200 for manufacturing a reaming apparatus 100/1000, according to embodiments disclosed herein. For discussion purposes, the process 1200 is described with reference to the previous figures.

At 1202, a body 102/1002 of a reaming apparatus 100/1000 can be formed having a planar front surface and a planar back surface. For example, a block of material (e.g., metal) can be machined in order to create a cylindrically-shaped body 102/1002. In some embodiments, the body 102/1002 can be formed by an injection molding, an extrusion, or a 3D printing technique.

At 1204, one or more annular groove 114/1014 can be created in the planar front surface of the body 102/1002 such that the groove(s) 114/1014 is/are concentric with a center 116/1016 of the body 102/1002. For example, metal machining techniques can be utilized to create a circular, or annular groove(s) 114/1014 in the planar front surface of the body 102/1002. In some embodiments, the annular groove(s) 114/1014 is formed as part of an injection molding or 3D printing process.

At 1206, a straight groove 106/1006 can be created in the planar front surface of the body 102/1002 such that the straight groove 106/1006 is radially aligned with the center 116/1016 of the body 102/1002 and intersects the annular groove(s) 114/1014 at one or more locations of the annular groove(s) 114/1014. In some embodiments, the straight groove 106/1006 is created such that it passes through the center 116/1016 of the body 102/1002. In an example, metal machining techniques can be utilized to create a straight groove 106/1006. In some embodiments, the straight groove 106/1006 is formed as part of an injection molding or 3D printing process.

Other features may be formed in the body 102/1002 in addition to the aforementioned grooves. For example, one or more holes 120, the recessed area 600, and/or a through hole 602 may be created in the body 102/1002.

At 1208, a reaming blade 104/1004 may be formed having a planar front surface 112/1012. The reaming blade 104/1004 may be formed as an elongate member that is long and thin, like a ruler, and that is of a height that is no greater than a depth of the straight groove 106/1006 in the body 102/1002.

At 1210, one or more notches 110/1010 may be created in the planar front surface 112/1012 of the reaming blade 104/1004 at respective positions on the reaming blade 104/1004 such that the notch(es) 110/1010 will be substantially aligned with the annular groove(s) 114/1014 when the reaming blade 104/1004 is disposed within the straight groove 106/1006.

Figure 13:
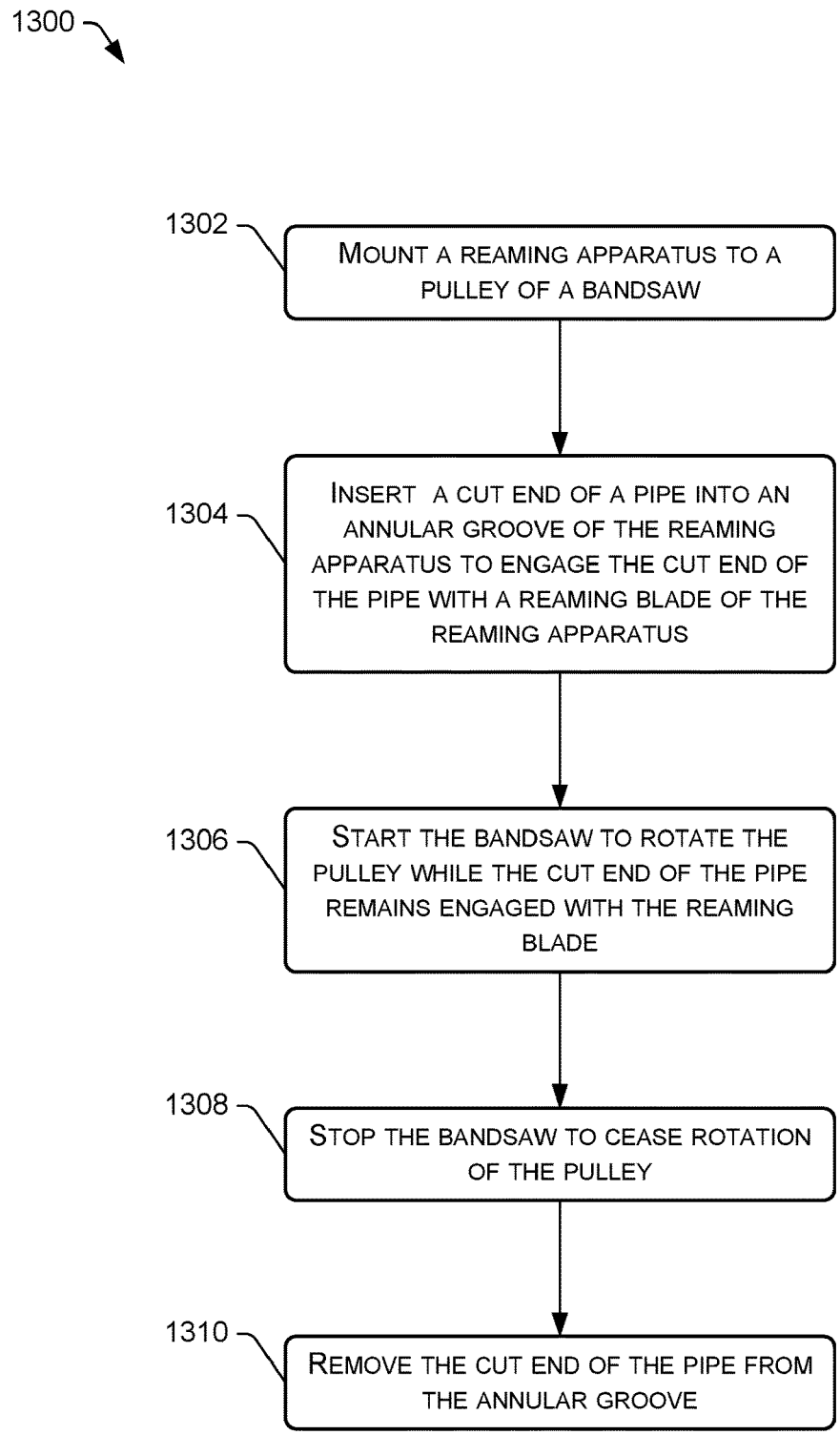
FIG. 13 is a flow diagram of an example process for using a reaming apparatus, according to embodiments disclosed herein.

FIG. 13 is a flow diagram of an example process 1300 for using a reaming apparatus, according to embodiments disclosed herein. For discussion purposes, the process 1300 is described with reference to the previous figures.

At 1302, a user can mount the reaming apparatus 100/1000 to a pulley 200 of a bandsaw 202, as described herein. The reaming apparatus 100/1000 can have the features described herein, such as the body 102/1002 having a planar front surface 108/1008, one or more annular grooves 114/1014, and a reaming blade 104/1004 disposed within a straight groove 106/1006 of the body 102/1002, the reaming blade 104/1004 having one or more notches 110/1010 that are aligned with the annular groove(s) 114/1014. Furthermore, mounting the reaming apparatus 100/1000 to the pulley 200 at block 1302 may involve at least some of the operations described with reference to FIG. 2A.

At 1304, the user may insert a cut end of a pipe (e.g., the pipe 300 of FIG. 3B) into an annular groove 114/1014 of the body 102/1002 of the reaming apparatus 100/1000 to engage the cut end of the pipe with the reaming blade 104/1004 of the reaming apparatus 100/1000. In other words, the cut end of the pipe is in contact with the reaming blade 104/1004. It is to be appreciated that the user may bring the pipe to the reaming apparatus 100/1000, bring the reaming apparatus 100/1000 to the pipe, or a combination of both.

At 1306, the user may start the bandsaw 202 (e.g., by pulling the trigger 308, or otherwise operating the bandsaw 202) to rotate the pulley 200 while the cut end of the pipe remains engaged with the reaming blade 104/1004 of the reaming apparatus 100/1000. The user may press the pipe against the reaming blade 104/1004 while the pulley 200 is rotating the reaming apparatus 100/1000 to apply some pressure to keep the pipe engaged with the reaming blade 104/1004 during the reaming process.

At 1308, the user may stop the bandsaw 202 (e.g., by releasing the trigger 308, or otherwise ceasing to operate the bandsaw 202) to cease rotation of the pulley 200.

At 1310, the user may remove the cut end of the pipe from the annular groove 114/1014 of the body 102/1002 of the reaming apparatus 100/1000 to disengage the cut end of the pipe from the reaming blade 104/1004. Again, the user may move the pipe away from the reaming apparatus 100/1000, move the reaming apparatus 100/1000 away from the pipe, or a combination of both.

The process 1300 allows for quickly and efficiently reaming a pipe, as compared to existing technique that involve using hand reamers at a job site. The use of the bandsaw 202 as a power tool for reaming makes reaming pipe fast. The design of the reaming apparatus 100/1000 allows for safe and effective reaming of pipe at a job site, and it allows for expediting an overall installation process where pipe is being installed at a job site.

It is to be appreciated that a manufacturer or vendor of the disclosed reaming apparatus 100/1000 may provide replacement reaming blades 104 so that users can easily interchange or swap a reaming blade 104/1004 for a new or different reaming blade 104/1004. Users can also remove the reaming blade 104/1004 to sharpen the reaming blade 104/1004, if necessary. It is also to be appreciated that the specific dimensions, proportions, shapes and configurations of any portion of the reaming apparatus 100/1000 are not limiting. For example, the reaming apparatus 100/1000 may be shaped or contoured in various ways to provide various ergonomics or aesthetics for a user. Furthermore, although the examples shown herein depict a reaming apparatus 100/1000 with a single reaming blade 104/1004 that substantially spans a diameter, $D_O$, of the body 102/1002, an alternative configuration is to have a plurality of reaming blades that are radially aligned with the center 116/1016 of the body 102/1002, but that do not pass through the center 116/1016 of the body 102/1002. This design could potentially accommodate three or more reaming blades that are spaced about the planar front surface 108 at different angles to provide even more notches 110/1010 per revolution.

There may be a practical limit to a number of reaming blades 104/1004 and/or notches 110/1010 that are useful for reaming pipe, as a high number of notches in contact with the cut end of the pipe may result in added friction and more difficulty reaming pipe. In at least one configuration, four reaming blades 104/1004 may be positioned within two straight grooves 106/1006 that are orthogonal to each other, each reaming blade 104/1004 spaced about 90 degrees from an adjacent reaming blade. The body 102/1002 could have two straight grooves 106/1006 in a cross formation, and four reaming blades 104/1004 can be disposed in the straight grooves 106/1006 with two reaming blades 104/1004 per groove 106/1006.

Unless otherwise indicated, all numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value. Notwithstanding that the numerical ranges and parameters are approximations, the numerical values set forth in the specific examples are reported as precisely as possible.

Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein does not pose a limitation on the scope of the claims. No language in the specification should be construed as indicating any non-claimed element essential to the practice of the claimed apparatus or process.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

What is claimed is:

1. A reaming apparatus comprising:
a body having:
   a planar front surface;
   an annular groove defined in the planar front surface of the body, the annular groove being concentric with a center of the body and configured to receive an end of a pipe that is to be reamed;
   a straight groove defined in the planar front surface of the body, the straight groove passing through the center of the body and intersecting the annular groove; and
   a planar back surface having a recessed area at the center of the body; and
   a through hole at the center of the body, the through hole having a first diameter at the planar front surface of the body and a second diameter at the recessed area of the planar back surface of the body, the second diameter being less than the first diameter, and the through hole being configured to mount the body to a pulley of a bandsaw using a fastener; and
a reaming blade having a planar front surface and at least one v-shaped notch defined in the planar front surface of the reaming blade, the at least one v-shaped notch being positioned on the reaming blade to substantially align with the annular groove when the reaming blade is disposed within the straight groove.

2. The reaming apparatus of claim 1, wherein:
the straight groove intersects the annular groove at a first location of the annular groove and at a second location of the annular groove;
the at least one v-shaped notch is a first v-shaped notch defined in the planar front surface of the reaming blade and positioned on the reaming blade to substantially align with the annular groove at the first location of the annular groove when the reaming blade is disposed within the straight groove; and
the reaming blade further includes a second v-shaped notch defined in the planar front surface of the reaming blade, the second v-shaped notch being positioned on the reaming blade to substantially align with the annular groove at the second location of the annular groove when the reaming blade is disposed within the straight groove.

3. The reaming apparatus of claim 1, wherein:
the body further includes a side surface having at least one hole that extends from the side surface of the body to the straight groove, the at least one hole being threaded and configured to receive a set screw; and
the reaming apparatus further includes the set screw configured to be screwed into the at least one hole for securing the reaming blade within the straight groove when the reaming blade is disposed within the straight groove.

4. The reaming apparatus of claim 3, wherein:
the at least one hole is a first hole that is offset from the center of the body in a first direction;
the set screw is a first set screw;
the side surface of the body further includes a second hole that extends from the side surface of the body to the straight groove, the second hole being threaded, configured to receive a second set screw, and offset from the center of the body in a second direction opposite the first direction; and the second set screw is configured to be screwed into the second hole for securing the reaming blade within the straight groove when the reaming blade is disposed within the straight groove.

5. The reaming apparatus of claim 1, wherein:
the body is cylindrical in shape;
the body further includes a planar back surface; and
a height of the body, as measured from the planar front surface of the body to the planar back surface of the body, is less than a diameter of the body.

6. The reaming apparatus of claim 1, wherein the straight groove has a depth that is greater than a height of the reaming blade such that the reaming blade does not extend beyond the planar front surface of the body when the reaming blade is disposed within the straight groove.

7. The reaming apparatus of claim 1, wherein:
the annular groove is a first annular groove having a first diameter and a first width;
the body further includes a second annular groove defined in the planar front surface of the body, the second annular groove being concentric with the center of the body and configured to receive an end of an additional pipe that is to be reamed, the second annular groove having a second diameter that is different than the first diameter and a second width that is different than the first width,
the straight groove intersects the first annular groove at a first location of the first annular groove;
the straight groove intersects the second annular groove at a second location of the second annular groove;
the at least one v-shaped notch is a first v-shaped notch defined in the planar front surface of the reaming blade and positioned on the reaming blade to substantially align with the first annular groove at the first location when the reaming blade is disposed within the straight groove; and
the reaming blade further includes a second v-shaped notch defined in the planar front surface of the reaming blade, the second v-shaped notch being positioned on the reaming blade to substantially align with the second annular groove at the second location when the reaming blade is disposed within the straight groove.

8. A reaming apparatus comprising:
a body that is cylindrical in shape, the body having a planar back surface and a recessed area defined in the planar back surface of the body at a center of the body to accommodate mounting the reaming apparatus to a pulley of a bandsaw; and a planar front surface;
a reaming blade secured to the body, the reaming blade being radially aligned with the center of the body and having multiple notches to ream pipes of different diameters.

9. The reaming apparatus of claim 8, wherein:
the body further includes:
a planar front surface;
an annular groove defined in the planar front surface of the body, the annular groove being concentric with the center of the body; and
a straight groove defined in the planar front surface of the body, the straight groove being radially aligned with the center of the body and intersecting the annular groove;
the straight groove passes through the center of the body and intersects the annular groove at a first location of the annular groove and at a second location of the annular groove;

a first notch of the multiple notches is defined in a planar front surface of the reaming blade and positioned on the reaming blade to substantially align with the annular groove at the first location of the annular groove when the reaming blade is disposed within the straight groove; and
the reaming blade, or an additional reaming blade, further includes a second notch defined in the planar front surface of the reaming blade or an additional planar front surface of the additional reaming blade, the second notch being positioned on the reaming blade or the additional reaming blade to substantially align with the annular groove at the second location of the annular groove when the reaming blade or the additional reaming blade is disposed within the straight groove.

10. The reaming apparatus of claim 8, wherein the body further includes:
a planar front surface; and
a through hole at the center of the body, the through hole having a first diameter at the planar front surface of the body and a second diameter at the recessed area of the planar back surface of the body, the second diameter being less than the first diameter.

11. The reaming apparatus of claim 8, wherein:
the body further includes:
a planar front surface;
a straight groove defined in the planar front surface of the body, the straight groove being radially aligned with the center of the body; and
a side surface having at least one hole that extends from the side surface of the body to the straight groove, the at least one hole being threaded and configured to receive a set screw; and
the reaming apparatus further includes the set screw configured to be screwed into the at least one hole for securing the reaming blade within the straight groove when the reaming blade is disposed within the straight groove.

12. The reaming apparatus of claim 11, wherein:
the at least one hole is a first hole that is offset from the center of the body in a first direction;
the set screw is a first set screw;
the side surface of the body further includes a second hole that extends from the side surface of the body to the straight groove, the second hole being threaded, configured to receive a second set screw, and offset from the center of the body in a second direction opposite the first direction; and
the second set screw is configured to be screwed into the second hole for securing the reaming blade within the straight groove when the reaming blade is disposed within the straight groove.

13. The reaming apparatus of claim 8, wherein:
the body further includes a planar front surface; and
a height of the body, as measured from the planar front surface of the body to the planar back surface of the body, is less than a diameter of the body.

14. The reaming apparatus of claim 8, wherein:
the body further includes a planar front surface and a straight groove defined in the planar front surface of the body, the straight groove being configured to receive the reaming blade, and
the straight groove has a depth that is greater than a height of the reaming blade such that the reaming blade does not extend beyond the planar front surface of the body when the reaming blade is disposed within the straight groove.

15. The reaming apparatus of claim 8, wherein:
the body further includes:
a planar front surface;
a first annular groove defined in the planar front surface of the body, the first annular groove being concentric with the center of the body, the first annular groove having a first diameter and a first width;
a second annular groove defined in the planar front surface of the body, the second annular groove being concentric with the center of the body, the second annular groove having a second diameter that is different than the first diameter and a second width that is different than the first width; and
a straight groove defined in the planar front surface of the body, the straight groove being radially aligned with the center of the body;
the straight groove intersects the first annular groove at a first location of the first annular groove;
the straight groove intersects the second annular groove at a second location of the second annular groove;
a first notch of the multiple notches is defined in a planar front surface of the reaming blade and positioned on the reaming blade to substantially align with the first annular groove at the first location when the reaming blade is disposed within the straight groove; and
a second notch of the multiple notches is defined in the planar front surface of the reaming blade, the second notch being positioned on the reaming blade to substantially align with the second annular groove at the second location when the reaming blade is disposed within the straight groove.

16. The reaming apparatus of claim 8, wherein the recessed area is substantially circular in shape.

17. The reaming apparatus of claim 8, wherein:
the body further includes a planar front surface; and
the reaming blade is recessed below the planar front surface of the body.

18. A reaming apparatus comprising:
means for receiving a pipe that is to be reamed, the means for receiving having;
a planar front surface;
an annular groove defined in the planar front surface of the means for receiving, the annular groove being concentric with a center of the means for receiving;
a straight groove defined in the planar front surface of the means for receiving, the straight groove being radially aligned with the center of the means for receiving and intersecting the annular groove; and
means for mounting the reaming apparatus to a pulley of a bandsaw, the means for mounting being at the center of the means for receiving; and
means for reaming the pipe, the means for reaming having a planar front surface and at least one notch defined in the planar front surface of the means for reaming, the means for reaming configured to be disposed within the straight groove.

19. The reaming apparatus of claim 18, further comprising means for securing the means for reaming within the straight groove.

20. The reaming apparatus of claim 18, wherein the straight groove has a depth that is greater than a height of the means for reaming such that the means for reaming does not extend beyond the planar front surface of the means for receiving when the means for reaming is disposed within the straight groove.

* * * * *